(12) United States Patent
Shin

(10) Patent No.: US 12,436,675 B2
(45) Date of Patent: Oct. 7, 2025

(54) ELECTRONIC DEVICE FOR PROCESSING HANDWRITING INPUT AND METHOD FOR OPERATING THE SAME

(71) Applicant: Samsung Electronics Co., Ltd., Suwon-si (KR)

(72) Inventor: Jinsu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 17/659,616

(22) Filed: Apr. 18, 2022

(65) Prior Publication Data

US 2022/0350478 A1    Nov. 3, 2022

Related U.S. Application Data

(63) Continuation of application No. PCT/KR2022/003084, filed on Mar. 4, 2022.

(30) Foreign Application Priority Data

Apr. 28, 2021    (KR) .................. 10-2021-0054837

(51) Int. Cl.
*G06F 3/04883* (2022.01)
*G06F 3/041* (2006.01)
(Continued)

(52) U.S. Cl.
CPC ...... *G06F 3/04883* (2013.01); *G06F 3/04166* (2019.05); *G06T 11/60* (2013.01); *G06T 13/80* (2013.01)

(58) Field of Classification Search
None
See application file for complete search history.

(56) References Cited

U.S. PATENT DOCUMENTS

2013/0201133 A1*  8/2013  Oh ................. G06F 3/03545
                                                345/173
2014/0064620 A1    3/2014  Zhang
(Continued)

FOREIGN PATENT DOCUMENTS

KR    20160003112 A    1/2016
KR    20160064925 A    6/2016
(Continued)

OTHER PUBLICATIONS

International Search Report and Written Opinion of the International Searching Authority in connection with International Application No. PCT/KR2022/003084 issued Jun. 7, 2022, 11 pages.
(Continued)

*Primary Examiner* — Krishna P Neupane

(57) ABSTRACT

According to various embodiments, an electronic device may comprise a display; and a processor configured to recognize a first touch input on the display according to a first recognition period, display, on the display, a first text corresponding to the recognized first touch input, detect an event for changing a recognition period of the electronic device, set the recognition period to a second recognition period different from the first recognition period, based on the detected event, recognize a second touch input on the display according to the second recognition period, and display, on the display, a second text corresponding to the recognized second touch input.

20 Claims, 28 Drawing Sheets

(51) Int. Cl.
  *G06T 11/60* (2006.01)
  *G06T 13/80* (2011.01)

(56) References Cited

U.S. PATENT DOCUMENTS

| | | |
|---|---|---|
| 2014/0184542 A1 | 7/2014 | Mao et al. |
| 2014/0204036 A1 | 7/2014 | Schillings et al. |
| 2014/0363083 A1* | 12/2014 | Xia .................. G06F 3/0482 382/189 |
| 2015/0331504 A1 | 11/2015 | Chen et al. |
| 2016/0062535 A1 | 3/2016 | Nagasawa |
| 2016/0154579 A1 | 6/2016 | Lee et al. |
| 2017/0131832 A1 | 5/2017 | Lee et al. |
| 2018/0024654 A1 | 1/2018 | Koike et al. |
| 2018/0144450 A1 | 5/2018 | Ohki et al. |
| 2020/0042135 A1 | 2/2020 | Chae et al. |
| 2020/0174658 A1 | 6/2020 | Xia et al. |
| 2020/0356254 A1* | 11/2020 | Missig .................. G06T 13/80 |
| 2021/0349606 A1* | 11/2021 | Chang .................. G06F 40/171 |
| 2022/0012409 A1 | 1/2022 | Kim et al. |

FOREIGN PATENT DOCUMENTS

| | | |
|---|---|---|
| KR | 20170053533 A | 5/2017 |
| KR | 20200014544 A | 2/2020 |
| KR | 20220006237 A | 1/2022 |
| WO | 2014198039 A1 | 12/2014 |
| WO | 2014200736 A1 | 12/2014 |
| WO | 2014205648 A1 | 12/2014 |

OTHER PUBLICATIONS

Supplementary European Search Report dated Jun. 11, 2024, in connection with European Patent Application No. 22795946. 7, 34 pages.

Examination report issued Aug. 22, 2025, in connection with Korean Patent Application No. 10-2021-0054837, 14 pages.

* cited by examiner

Samsung → Samsung
Samsung → Sam
Samsung → Sam
Samsung → Samsun
Samsung → Samsun g
Samsung → Samsung
Samung → Samsung
Sam sung → Samsung

FIG.22

ELECTRONIC DEVICE FOR PROCESSING HANDWRITING INPUT AND METHOD FOR OPERATING THE SAME

CROSS-REFERENCE TO RELATED APPLICATIONS

This application is a bypass continuation of International Application No. PCT/KR2022/003084, filed on Mar. 4, 2022, and claims priority to Korean Patent Application No. 10-2021-0054837, filed on Apr. 28, 2021, in the Korean Intellectual Property Office, the disclosures of which are incorporated by reference herein in their entirety.

BACKGROUND

1. Field

Various embodiments of the disclosure relate to an electronic device for processing handwriting input and a method for operating the same.

2. Description of Related Art

Recently in wide use are portable electronic devices, such as smartphones, tablet PCs, or wearable devices. Users may make use of various functions using various input means, such as fingers or input tools, e.g., stylus pens.

Input using a stylus pen enables more accurate touch input than using a finger and may be useful for executing memo or sketch applications. Further, handwriting input provides a higher degree of freedom in creating content, rapid entry, and diversified uses due to enhanced character recognition technology.

When the touchscreen of an electronic device is touched by a finger or stylus pen that comes with the electronic device, and character recognition technology is applied to the handwritten content by touch entry in real-time, the system resources of the electronic device need to be consumed, and a delay may occur in screen output depending on the performance of the electronic device.

According to various embodiments of the disclosure, there may be provided an electronic device including a method for processing real-time character recognition operation on the handwriting input made through the touchscreen display of the electronic device.

Objects of the disclosure are not limited to the foregoing, and other unmentioned objects would be apparent to one of ordinary skill in the art from the following description.

SUMMARY

According to various embodiments, an electronic device may comprise a display; and a processor configured to recognize a first touch input on the display according to a first recognition period, display, on the display, first text corresponding to the recognized first touch input, detect an event for changing a recognition period of the electronic device, set the recognition period to a second recognition period different from the first recognition period, based on the detected event, recognize a second touch input on the display according to the second recognition period, and display, on the display, second text corresponding to the recognized second touch input.

According to various embodiments, a method for operating an electronic device may comprise recognizing a first touch input on a display of the electronic device according to a first recognition period, displaying, on the display, first text corresponding to the recognized first touch input, detecting an event for changing a recognition period of the electronic device, setting the recognition period to a second recognition period different from the first recognition period, based on the detected event, recognizing a second touch input on the display according to the second recognition period, and displaying, on the display, second text corresponding to the recognized second touch input.

According to various embodiments, there are provided an electronic device for processing handwriting input and a method for operating the same. Thus, it is possible to provide an optimized environment without performance degradation of the electronic device in handwriting input made by the user or character recognition and screen output corresponding thereto.

Other various effects may be provided directly or indirectly in the disclosure.

DESCRIPTION OF THE DRAWINGS

FIG. 22 is a view illustrating an operation method of an electronic device according to various embodiments;

DETAILED DESCRIPTION

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
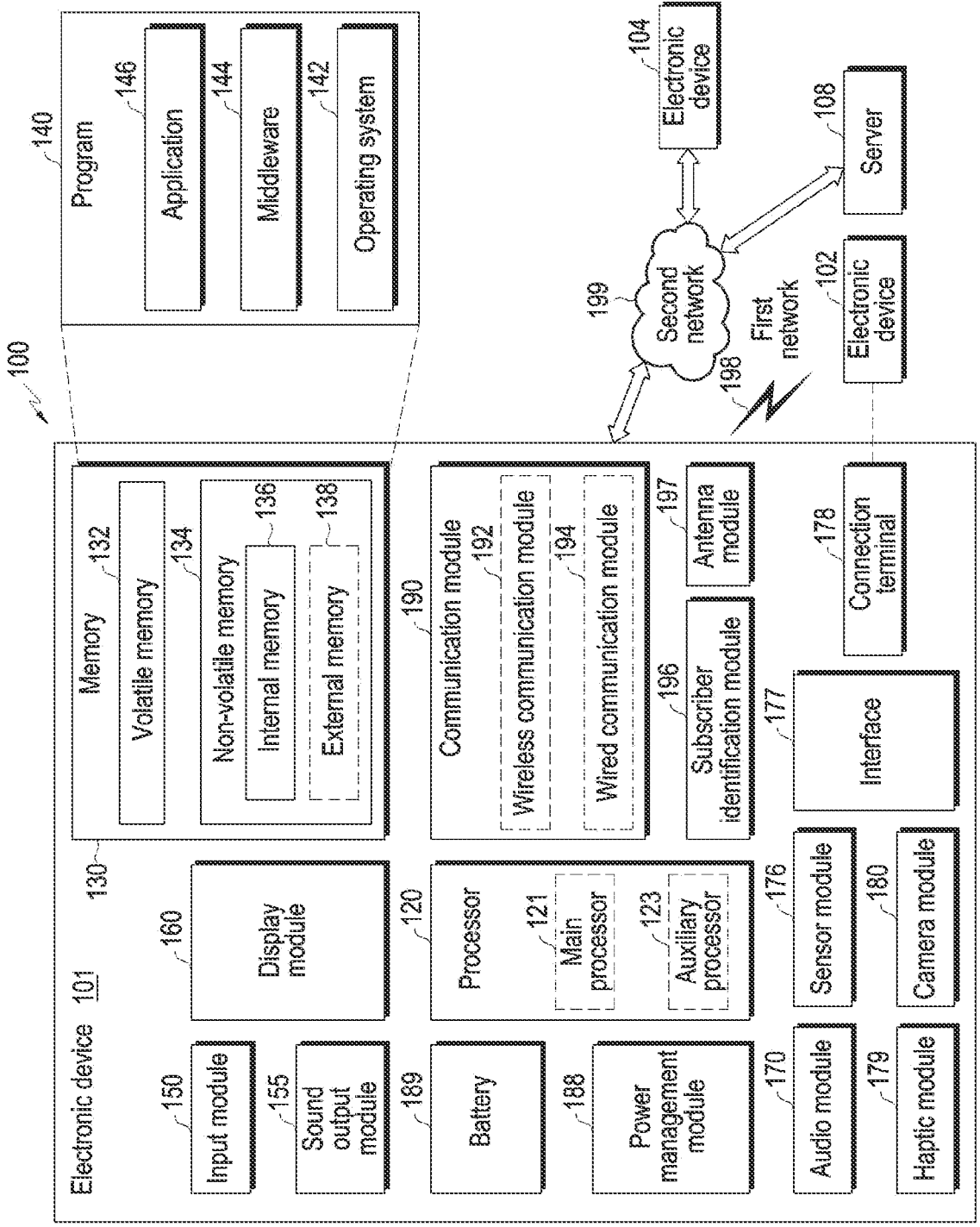
FIG. 1 is a block diagram illustrating an electronic device in a network environment according to various embodiments.

FIG. 1 is a block diagram illustrating an electronic device in a network environment according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
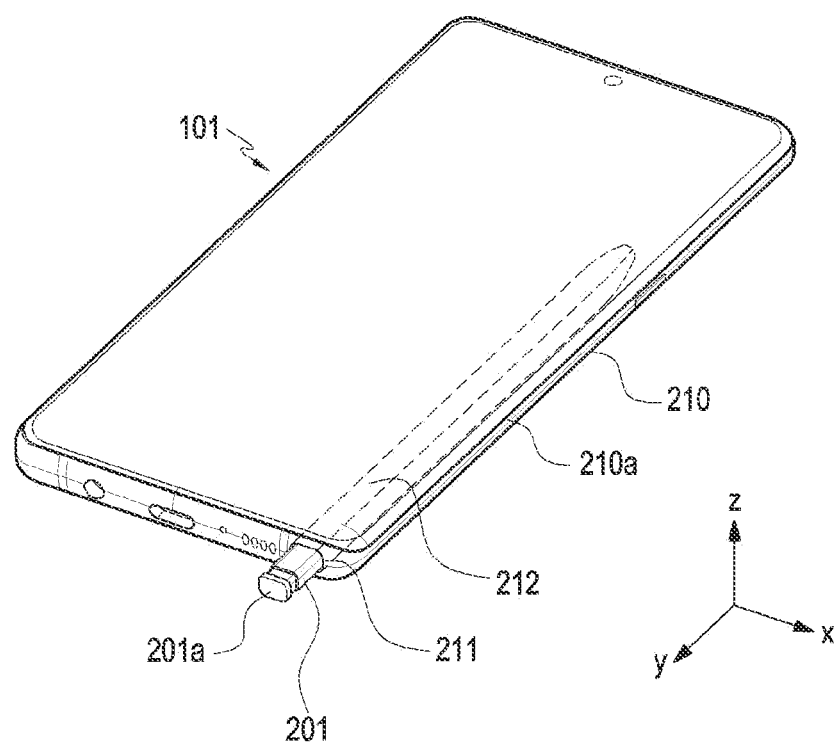
FIG. 2 is a perspective view illustrating an electronic device including a stylus pen according to various embodiments.

FIG. 2 is a perspective view illustrating an electronic device including a stylus pen according to various embodiments.

Referring to FIG. 2, according to certain embodiments, the electronic device 101 may include the configuration shown in FIG. 1 and may have a structure where the stylus pen 201 may be inserted. The electronic device 101 may include a housing 210, and a hole 211 may be formed in a portion of the housing 210, e.g., a portion of a side surface 210a. The electronic device 101 may include a first inner space 212, which is a storage space connected with the hole 211, and the stylus pen 201 may be inserted into the first inner space 212. In the embodiment shown, the stylus pen 201 may have a pressable first button 201a at an end thereof to be easily pulled out of the first inner space 212 of the electronic device 101. When the first button 201a is pressed, a repulsive mechanism (e.g., at least one elastic member, a spring) configured in association with the first button 201a may be operated to allow the stylus pen 201 to be removed from the first inner space 212.

According to certain embodiments, the electronic device 101 may include a structure in which the stylus pen 201 may be attached to the electronic device 101. For example, the electronic device 101 may include at least one magnetic material in a position adjacent to the attachment area so that the stylus pen 201 may be attached to the outside of the housing 210. The stylus pen 201 may be attached to the outside of the housing 210 of the electronic device 101 through at least one magnetic material.

According to certain embodiments, the stylus pen 201 may be configured and used separately without being inserted or attached to the electronic device 101. The electronic device 101 may not include a structure into which the stylus pen 201 may be inserted.

Figure 3:
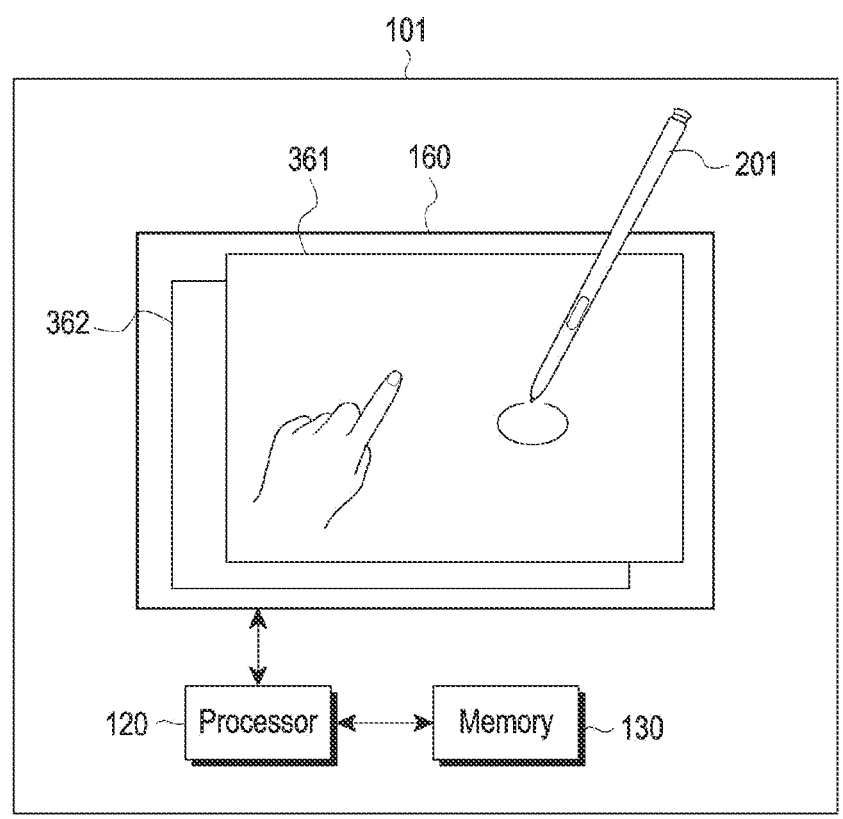
FIG. 3 is a block diagram illustrating an electronic device according to various embodiments.

FIG. 3 is a block diagram illustrating an electronic device according to various embodiments.

Referring to FIG. 3, according to certain embodiments, the electronic device 101 may include a display module 160 for detecting the input by the stylus pen 201. The display module 160 may simultaneously support input/output functions of data and may detect touches.

According to certain embodiments, the display module 160 may include a sensing panel 361 and a display panel 362. Although it is described in connection with FIG. 3 that the sensing panel 361 is included in the display module 160, the sensing panel 361 may operate in a state in which it forms a layered structure with the display panel 362 but is not included in the display module 160.

According to certain embodiments, the sensing panel 361 may detect the position of a touch input by the stylus pen, and the display panel 362 may output an image. According to certain embodiments, the display module 160 may further include a driving circuit for controlling the display panel 362 to output an image through the display panel 362.

According to certain embodiments, when the stylus pen 201 supports the electro-magnetic resonance (EMR) type, the sensing panel 361 may be configured as an input pad in an EMR type using electromagnetic sensor or electro-magnetic interface (EMI) type, but this is merely an example. The sensing panel 361 may also be configured as an input pad in an electrically coupled resonance (ECR) type or another type.

According to certain embodiments, the sensing panel 361 may receive a magnetic field from the stylus pen 201 and detect the position of the stylus pen 201 therefrom. The sensing panel 361 may include one or more panels forming a mutually layered structure to detect an input by a plurality of sensors.

According to certain embodiments, the sensing panel 361 may be implemented as a touchscreen panel (TSP), and if implemented as a touchscreen panel, identify the position of the stylus pen 201 based on the output signal from the electrode. According to certain embodiments, the stylus pen 201 may be implemented in an active electrostatic (AES) scheme, and it will be easily appreciated by one of ordinary skill in the art that it is not limited to a specific kind of implementation. According to certain embodiments, the sensing panel 361 may detect contact or proximity of a human body (e.g., the user's finger) as well as the stylus pen 201. For example, the sensing panel 361 may detect a touch-down, touch-move, or touch-up input by the stylus pen 201 or the user's finger. The sensing panel 361 may generate an input signal corresponding to a touch-down, touch-move, or touch-up input by the stylus pen 201 or the user's finger and may transfer it to the processor 120. According to certain embodiments, the sensing panel 361 may transfer the touch point (e.g., one touch point every 3 ms interval or 120 touch points per second) to the processor 120 at each designated time interval based on the touch-down-then-touch-move (e.g., drawing) input. At this time, the designated time interval when the sensing panel 361 transfers the touch point to the processor 120 may be changed while the electronic device 101 operates, but is not limited.

According to certain embodiments, the display panel 362 may receive and display the display data from the processor 120. For example, the display panel 362 may display an application screen according to execution of an application (e.g., a note application) from the processor 120 and may display at least one drawing object on the application screen. The drawing object may mean a handwriting object displayed on the display module 160 in response to the user's touch input. For example, the processor 120 may identify the stroke trajectory based on the touch points received from the sensing panel 361 at each designated time interval and control to display a drawing object corresponding to stroke data according to the identified stroke trajectory on the display panel 362. According to certain embodiments, the processor 120 may receive a touch-up signal based on a touch-up input during a touch move from the sensing panel 361. According to certain embodiments, the processor 120 may store the stroke data as one stroke data based on the reception of the touch-up signal.

The configuration of the display module 160 illustrated in FIG. 3 is merely an example, and the type and number of panels constituting the display module 160 and the positions of upper and lower layers of the panel vary depending on the manufacturing technology of the electronic device 101.

According to certain embodiments, the memory 130 may store various data used by at least one component (e.g., the processor 120 or the display module 160) of the electronic device 101. The various data may include, for example, software (e.g., the program) and input data or output data for a command related thereto. For example, the memory 130 may store instructions to perform the operation of the electronic device 101 (or the processor 120).

Figure 4:
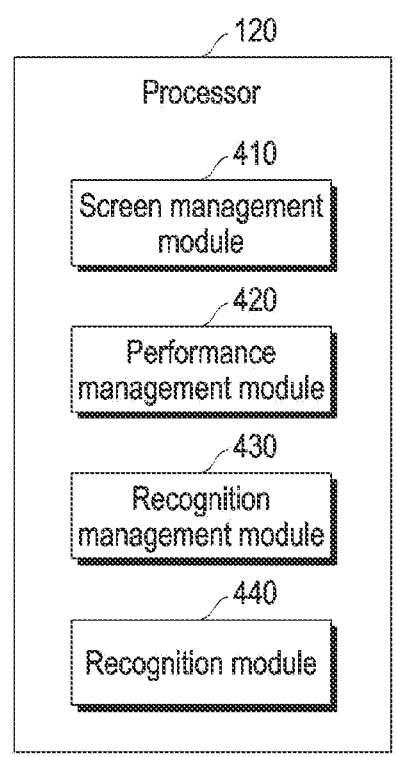
FIG. 4 is a view illustrating a configuration of a processor of an electronic device according to various embodiments.

FIG. 4 is a view illustrating a configuration of a processor of an electronic device according to various embodiments.

Referring to FIG. 4, according to certain embodiments, the processor 120 of the electronic device 101 may perform the operations of a screen management module 410, a performance management module 420, a recognition management module 430, and/or a recognition module 440. For example, the screen management module 410, the performance management module 420, the recognition management module 430, and/or the recognition module 440 may be software modules executed by the processor 120. Alternatively, the screen management module 410, the performance management module 420, the recognition management module 430, and/or the recognition module 440 may be hardware modules included in the processor 120 or independently present.

According to certain embodiments, the recognition module 440 may perform a recognition operation on stroke data based on a touch input made through the display module 160. Performing a recognition operation on a touch input made through the display module 160 may mean performing a recognition operation on stroke data based on the touch input. The recognition operation on the stroke data may mean extracting text (or symbols) corresponding to the touch input by performing recognition on the stroke data based on the touch input. That the text (or symbols) is extracted may mean that the text (or symbols) is recognized.

According to certain embodiments, the recognition management module 430 may process data requesting to perform a recognition operation on stroke data corresponding to a touch input.

According to certain embodiments, the screen management module 410 may display an application execution screen through the display module 160 and may perform processing to display a drawing object corresponding to the stroke data and/or text (or symbols) extracted according to the execution of a recognition operation on the stroke data on the application execution screen.

According to certain embodiments, the performance management module 420 may determine the performance of the screen update of the display module 160 and may determine whether there is a delay in the screen update.

The above-described operation of the screen management module 410, operation of the performance management module 420, operation of the recognition management module 430, and/or operation of the recognition module 440 are described as functionally performed in their respective modules. However, the respective operations of the modules may be integrated and managed in one module. Implementing each module is not limited. Hereinafter, specific operations of the screen management module 410, the performance management module 420, the recognition management module 430, and/or the recognition module 440 are described as controlled by the processor 120 or performed by the processor 120.

Figure 5:
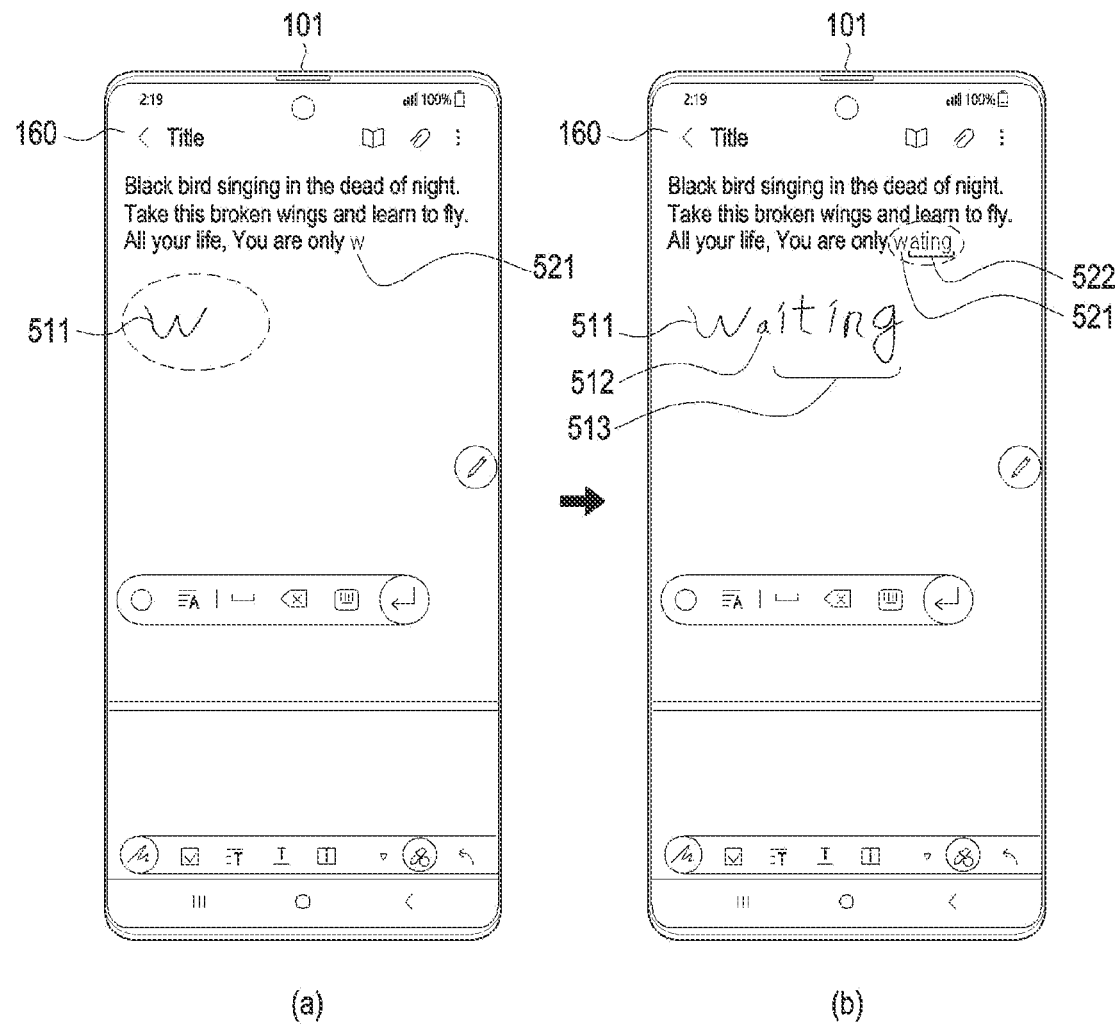
FIG. 5 is a view illustrating an operation method of an electronic device according to various embodiments.

FIG. 5 is a view illustrating an operation method of an electronic device according to various embodiments.

Referring to FIG. 5, according to certain embodiments, the electronic device 101 (e.g., the processor 120) may sense a touch input on the display module 160. Here, "touch input" may include, but is not limited to, continuous movement of a touch where the contact is not released. The electronic device 101 may display a drawing object corresponding to the touch input on the display module 160. The electronic device 101 may store stroke data based on the touch input and may perform a recognition operation on the stroke data based on the touch input. The electronic device 101 may display the text corresponding to the touch input on the display module 160 according to the recognition result of the stroke data. For example, referring to FIG. 5(*a*), the electronic device 101 may display an execution screen of an application (e.g., a note application) on the display module 160. The electronic device 101 may sense a first touch input (e.g., a touch input corresponding to "w") and display a first drawing object 511 (e.g., a "w"-shaped handwriting object) corresponding to the first touch input. The electronic device 101 may display first text 521 (e.g., text corresponding to "w" in a designated font) corresponding to the first touch input according to the recognition result of the first stroke data based on the first touch input. For example, when sensing the first touch input while text corresponding to the pre-input user input is displayed on the execution screen of the note application, the electronic device 101 may display the first drawing object 511 in the position corresponding to the first touch input on the display module 160 and display the first text 521 following the text corresponding to the pre-input user input.

According to certain embodiments, the electronic device 101 may sense a second touch input after sensing the first touch input. "One touch input" (e.g., the first touch input or the second touch input) may mean an input until a touch-up event is identified after a touch-move input following a touch-down. Thus, one touch input may mean input of continuous one stroke. For example, referring to FIG. 5(b), the following description hypothesizes that the user draws a handwriting of "waiting" on the display module 160 using the stylus pen 201. The electronic device 101 may sense a first touch input (e.g., a touch input corresponding to "w") and a first drawing object 511 (e.g., a "w"-shaped handwriting object) corresponding to the first touch input. The electronic device 101 may sense a second touch input (e.g., a touch input corresponding to "a") after sensing the first touch input and display a second drawing object 512 (e.g., a "a"-shaped handwriting object) corresponding to the second touch input. Thereafter, the electronic device 101 may receive subsequent touch inputs (e.g., touch inputs corresponding to "iting") and display corresponding subsequent drawing objects 513 (e.g., a handwriting object in the shape of "iting").

According to certain embodiments, when a single touch input is made, the electronic device 101 may store the data corresponding to one touch input, as one stroke data, based on identifying a touch-up event indicating the end time of the one touch input. In this case, the electronic device 101 may perform a recognition operation on only the one stroke data stored or may perform a recognition operation on a plurality of stroke data including the one stroke data stored. For example, referring to FIGS. 5(a) and (b), an embodiment is described below in which a recognition operation for stroke data based on a touch input corresponding to "w" may be performed, and a recognition operation is subsequently performed on the stroke data based on the touch inputs corresponding to "aiting." The electronic device 101 may sense a first touch input (e.g., a touch input corresponding to "w") and display a first drawing object 511 (e.g., a "w"-shaped handwriting object) corresponding to the first touch input. The electronic device 101 may perform a recognition operation on the first stroke data based on the first touch input and display the first text 521 (e.g., text corresponding to "w" in designated font) based on a result of the recognition operation. The electronic device 101 may sense a second touch input (e.g., a touch input corresponding to "a") and display a second drawing object 512 (e.g., a "a"-shaped handwriting object) corresponding to the second touch input. The electronic device 101 may sense subsequent touch inputs (e.g., touch inputs corresponding to "iting") and display corresponding drawing objects (e.g., a handwriting object in the shape of "iting") corresponding to the subsequent touch inputs. Thereafter, the electronic device 101 may perform a recognition operation on the second stroke data based on the second touch input (e.g., touch input corresponding to "a") and the subsequent stroke data based on the subsequent touch inputs (e.g., touch inputs corresponding to "iting") and display second text 522 (e.g., text corresponding to "aiting" in designated font) based on the result of the recognition operation. In this case, the electronic device 101 may simultaneously display the second text 522 According to certain embodiments or may display the text included in the second text 522 sequentially (e.g., in the order of "a," "i," "t," "i," "n," and "g"). According to the above-described operation of the electronic device 101, the user may recognize that the first drawing object 511 (e.g., "w"-shaped handwriting object) corresponding to the first touch input after the first touch input (e.g., touch input corresponding to "w") is made and before the second touch input (e.g., touch input corresponding to "a") is made, and the first text 521 (e.g., text corresponding to "w" in designated font) corresponding to the first touch input is displayed. Thereafter, the user may recognize that the second drawing object 512 (e.g., "a"-shaped handwriting object) corresponding to the second touch input is displayed after the second touch input (e.g., touch input corresponding to "a") is made and before the subsequent touch inputs (e.g., touch inputs corresponding to "iting") are made but may not recognize the text (e.g., text corresponding to "a" in designated font) corresponding to the second touch input because it is not yet displayed. Thereafter, the user may recognize drawing objects (e.g., handwriting object in the shape of "iting") corresponding to the subsequent touch inputs after the subsequent touch inputs (e.g., touch inputs corresponding to "iting") are made and may recognize the second text 522 (e.g., text corresponding to "aiting" in designated font) corresponding to the second touch input and the subsequent touch inputs.

"Recognition period" may mean the period when the electronic device 101 (e.g., the processor 120) performs a recognition operation on touch input-based stroke data. For example, the electronic device 101 may store at least one stroke data corresponding to at least one touch input. If the recognition period is one second, the electronic device 101 may perform a recognition operation on the at least one stored stroke data during the first one second (e.g., 0 sec to 1 sec) at the moment that the first recognition period is reached (e.g., the moment that one second is reached) and may perform a recognition operation on the at least one stored stroke data during the next one second (e.g., 1 sec to 2 sec) at the moment that the next recognition period is reached (e.g., the moment that the two seconds are reached). For example, referring to FIG. 5, in (a) of FIG. 5, as the recognition period (e.g., one second) is reached after the first touch input (e.g., touch input corresponding to "w") is made and after the second touch input (e.g., touch input corresponding to "a") is made, the electronic device 101 may perform a recognition operation on the first touch input and display the first text 521 (e.g., text corresponding to "w" in designated font) corresponding to the first touch input. Then, in (b) of FIG. 5, as the recognition period is not yet reached after the second touch input (e.g., touch input corresponding to "a") is made, the electronic device 101 does not perform a recognition operation on the second touch input and, as the recognition period is reached after the subsequent touch inputs (e.g., touch inputs corresponding to "iting") are made, perform a recognition operation on the second touch input and subsequent touch inputs and display the second text 522 (e.g., text corresponding to "aiting" in designated font) corresponding to the second touch input and the subsequent touch inputs.

According to certain embodiments, the electronic device 101 may not perform a recognition operation even when the recognition period expires. For example, in a case where the recognition period is a first period, based on an occasion where the first touch input starts at a first time before the expiration time of the first period (e.g., a touch-down event is identified at the first time), and the first touch input continues at the expiration time of the first period (e.g., based on identifying continuous touch-move event after the first time), the electronic device 101 may not perform a recognition operation on the first touch input at the expiration time of the first period and may perform a recognition operation on the first touch input at a second time (e.g., at a second time when a touch-up event related to the first touch input is identified) when the first touch input is terminated after the expiration time of the first period.

Figure 6:
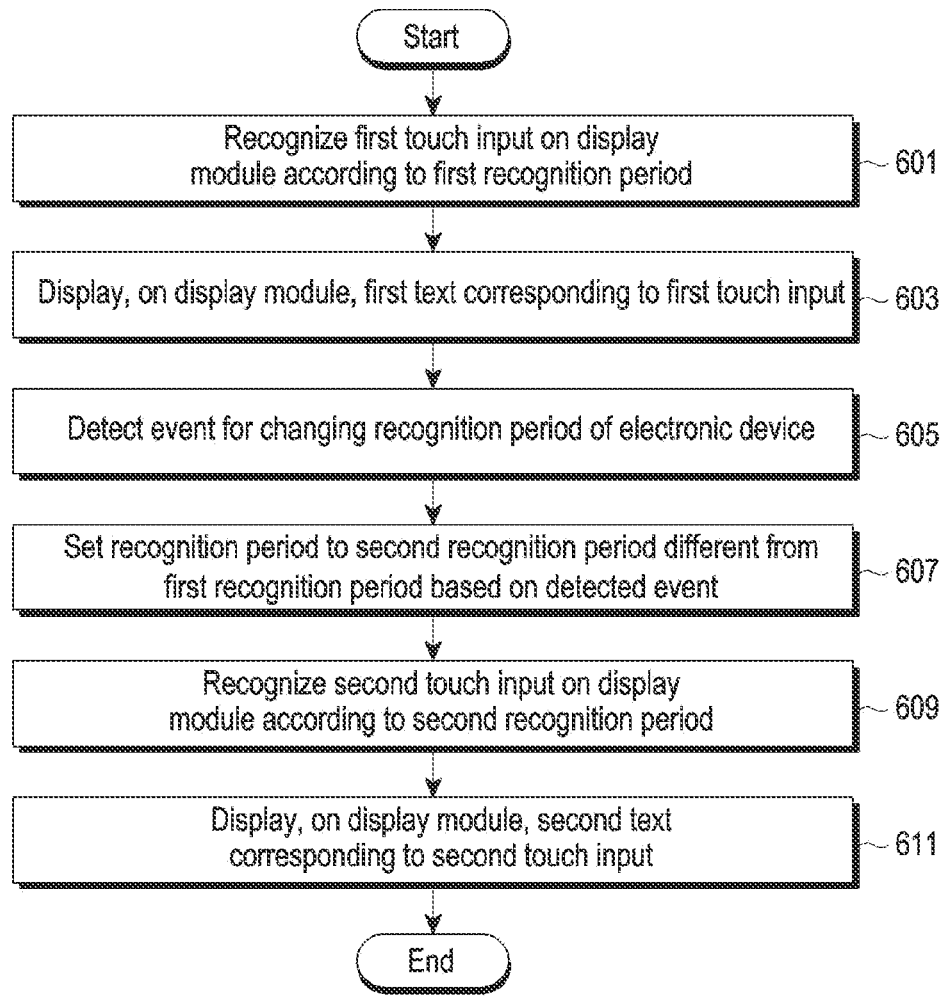
FIG. 6 is a flowchart illustrating an operation method in which the recognition period of an electronic device is changed according to various embodiments.

FIG. 6 is a flowchart illustrating an operation method in which the recognition period of an electronic device is changed according to various embodiments. FIG. 6 is described with reference to FIG. 5.

Referring to FIG. 6, in operation 601, according to various embodiments, when the set recognition period is the first period, the electronic device 101 (e.g., the processor 120) may recognize a first touch input on the display module 160 according to the first period. As described above, that the electronic device 101 recognizes the first touch input on the display module 160 may mean storing the first stroke data based on the first touch input and performing a recognition operation on the stored first stroke data. For example, referring to FIG. 5(a), the electronic device 101 may sense the first touch input (e.g., touch input corresponding to "w") on the display module 160 after the start (e.g., the moment of 0 sec) of the first period (e.g., the period of one second) and, as the first period is reached (e.g., the moment of 1 sec), recognize the first touch input.

In operation 603, according to various embodiments, the electronic device 101 may display first text corresponding to the first touch input on the display module 160 according to a result of recognition on the first touch input. For example, referring to FIG. 5(a), the electronic device 101 may display the first text 521 (e.g., text corresponding to "w" in a designated font) corresponding to the first touch input (e.g., touch input corresponding to "w"). As described above in connection with FIG. 5, the electronic device 101 may display a drawing object corresponding to the first touch input, along with the text.

In operation 605, according to various embodiments, the electronic device 101 may detect an event for changing the recognition period. Detection of an event for changing the recognition period is described below in connection with FIGS. 7 to 12.

In operation 607, according to various embodiments, the electronic device 101 may set the recognition period to a second period (e.g., a period of two seconds) different from the first period (e.g., a period of one second) based on detection of an event for changing the recognition period. When the electronic device 101 changes the recognition period to the second period different from the first period, the electronic device 101 may determine the size of the second period based on the detected event. An embodiment of determining the size of the second period is described below in connection with FIGS. 7 to 12.

In operation 609, according to various embodiments, the electronic device 101 may recognize a second touch input on the display module 160 based on the set recognition period being the second period. For example, referring to FIG. 5(b), the electronic device 101 may sense at least one second touch input (e.g., the second touch input (e.g., touch input corresponding to "a") and subsequent touch inputs (e.g., touch inputs corresponding to "iting") described in connection with FIG. 5) on the display module 160 after the start (e.g., the moment of 1 sec) of the second period (e.g., a period of two seconds) and, as the second period is reached (e.g., the moment of 3 sec), recognize at least one second touch input (e.g., the second touch input (e.g., touch input corresponding to "a") and subsequent touch inputs (e.g., touch inputs corresponding to "iting") described in connection with FIG. 5).

In operation 611, according to various embodiments, the electronic device 101 may display second text corresponding to the second touch input on the display module 160 according to a result of recognition on the second touch input. For example, referring to FIG. 5(b), the electronic device 101 may display second text 522 (e.g., text corresponding to "aiting" in designated font) corresponding to the at least one second touch input (e.g., the second touch input (e.g., touch input corresponding to "a") and subsequent touch inputs (e.g., touch inputs corresponding to "iting") described in connection with FIG. 5).

Figure 7:
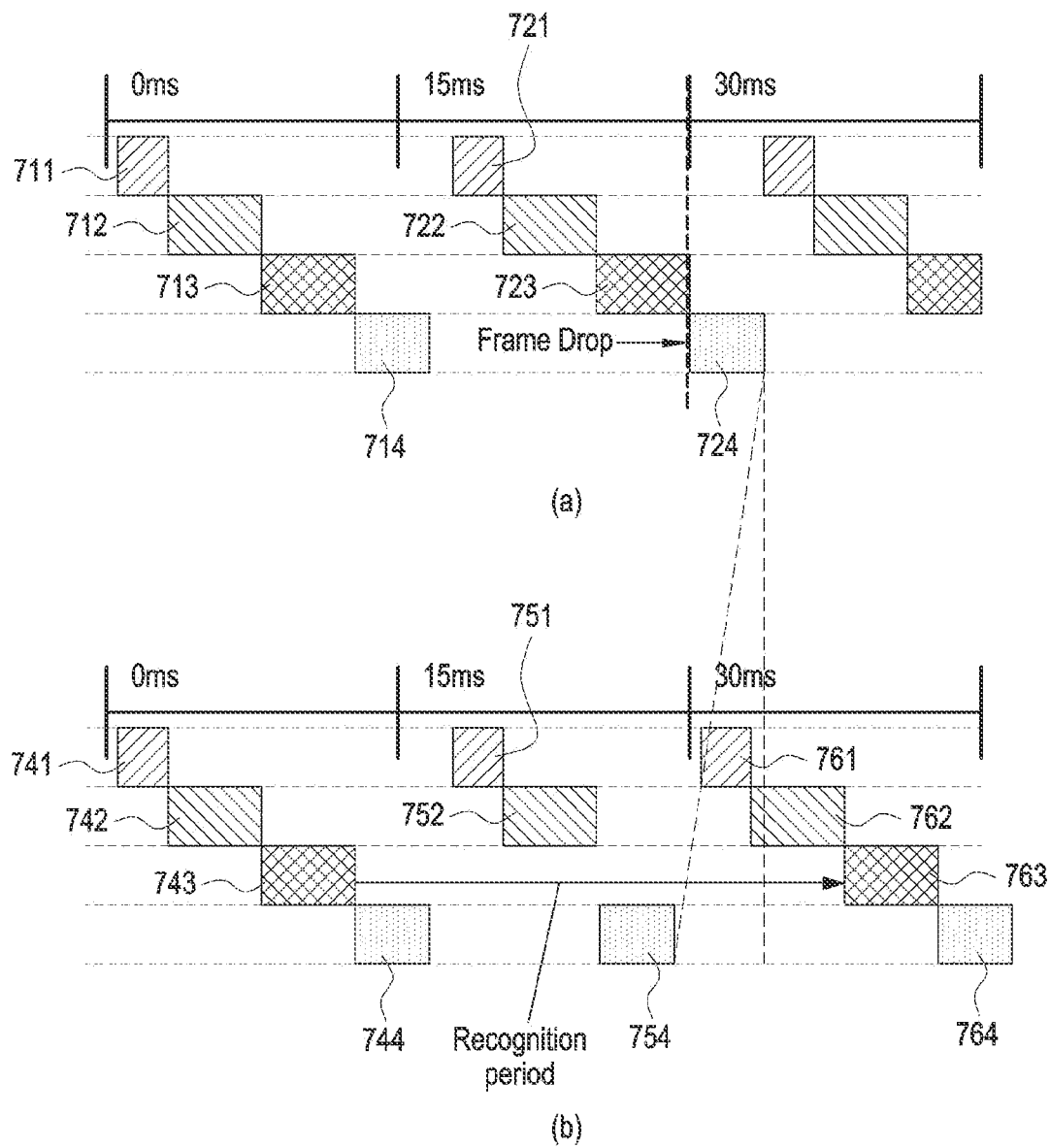
FIG. 7 is a view illustrating changing the recognition period of an electronic device according to various embodiments.

FIG. 7 is a view illustrating changing the recognition period of an electronic device according to various embodiments.

FIG. 7 illustrates a case where the frame update period is 15 ms. A frame update may mean that a new frame is displayed on the display module 160. The frame update period may mean a period in which the frame is updated.

In FIG. 7(a), the electronic device 101 (e.g., the processor 120) may sense a first touch input (operation 711) and process the first touch input (operation 712). According to certain embodiments, the operation of processing a touch input may include transferring information about touch points corresponding to the touch input (e.g., a touch-down, touch-move, and/or touch-up input) to the processor 120 and allowing the processor 120 to identify the stroke trajectory based on the transferred touch points so as to display a drawing object corresponding to the touch input. After operation 712, the electronic device 101 may perform a recognition operation on the first stroke data according to the stroke trajectory identified in relation to the first touch input (operation 713). After operation 713, the electronic device 101 may display a first drawing object corresponding to the first touch input according to the stroke trajectory identified in relation to the first touch input and display, on the display module 160, first text corresponding to the first touch input according to a result of recognition on the first stroke data (operation 714). As operation 714 is performed, a new frame may be displayed on the display module 160, which may be named frame update as described above. After operation 714, the electronic device 101 may sense a second touch input (operation 721) and process the second touch input (operation 722). After operation 722, the electronic device 101 may perform a recognition operation on the second stroke data according to the stroke trajectory identified in relation to the second touch input (operation 723). After operation 723, the electronic device 101 may display a second drawing object corresponding to the second touch input according to the stroke trajectory identified in relation to the second touch input and display, on the display module 160, second text corresponding to the second touch input according to a result of recognition on the second stroke data (operation 724). At this time, the electronic device 101 may identify that a frame drop has occurred. For example, referring to FIG. 7(a), operation 724 may be performed after the set frame update period (e.g., the moment that 30 ms is reached after 15 ms), so that the electronic device 101 may identify that a frame drop has occurred. When a frame drops, e.g., when no frame is generated to be displayed at a time after the frame update period elapses, a frame update may not be performed at the frame update period, or update may be delayed. However, processing a frame drop is not limited. As the frame drop is identified, the electronic device 101 may detect an event for changing the recognition period. The electronic device 101 may change the recognition period from the first period (e.g., performing one recognition operation every frame update period) to the second period (e.g., performing one recognition operation every two frame update period) according to the event for changing the recognition period detected in connection with operation 724.

(b) of FIG. 7 illustrates a case where the recognition period is changed from the first period (e.g., performing one recognition operation every frame update period) to the second period (e.g., performing one recognition operation every two frame update periods).

In FIG. 7(b), the electronic device 101 (e.g., the processor 120) may sense a fourth touch input (operation 741) and process the fourth touch input (operation 742). After operation 742, the electronic device 101 may perform a recognition operation on the fourth stroke data according to the stroke trajectory identified in relation to the fourth touch input (operation 743). After operation 743, the electronic device 101 may display a fourth drawing object corresponding to the fourth touch input according to the stroke trajectory identified in relation to the fourth touch input and display, on the display module 160, fourth text corresponding to the fourth touch input according to a result of recognition on the fourth stroke data (operation 744). Thereafter, the electronic device 101 may sense a fifth touch input (operation 751) and process the fifth touch input (operation 752). After operation 752, the electronic device 101 may omit the recognition operation on the fifth stroke data according to the stroke trajectory identified in connection with the fifth touch input and display a fifth drawing object corresponding to the fifth touch input according to the stroke trajectory identified in relation to the fifth touch input (operation 754). Thereafter, the electronic device 101 may sense a sixth touch input (operation 761) and process the sixth touch input (operation 762). After operation 762, the electronic device 101 may perform a recognition operation on the fifth stroke data according to the stroke trajectory identified in relation to the fifth touch input and a recognition operation on the sixth stroke data according to the stroke trajectory identified in relation to the sixth touch input (operation 763). After operation 763, the electronic device 101 may display a sixth drawing object corresponding to the sixth touch input according to the stroke trajectory identified in relation to the sixth touch input and display, on the display module 160, the fifth text corresponding to the fifth touch input and the sixth touch input according to a result of recognition on the fifth stroke data and the sixth stroke data (operation 764). Accordingly, the electronic device 101 may identify that no frame drop has occurred in (b) of FIG. 7, unlike in (a) of FIG. 7.

Figure 8:
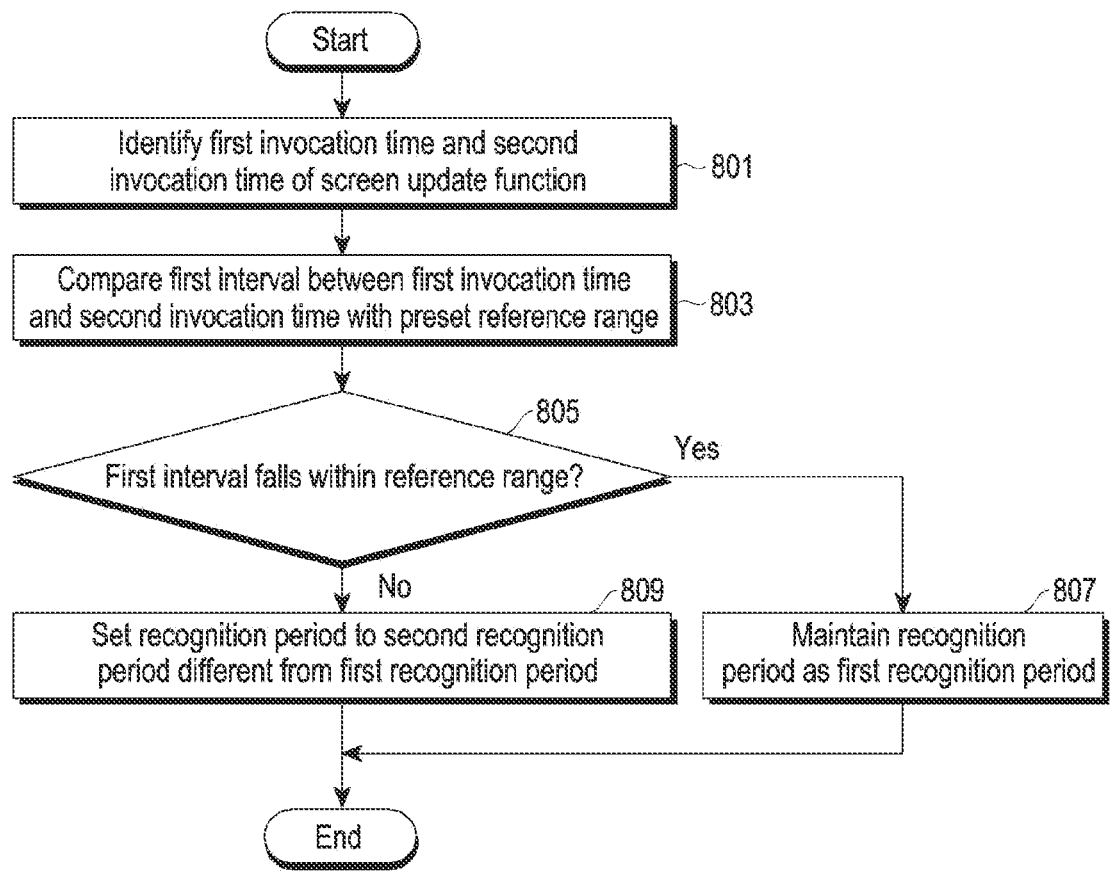
FIG. 8 is a flowchart illustrating an operation method of an electronic device according to various embodiments.

FIG. 8 is a flowchart illustrating an operation method of an electronic device according to various embodiments.

Referring to FIG. 8, in operation 801, according to various embodiments, the electronic device 101 (e.g., the processor 120) may identify a first invocation time and a second invocation time of at least one screen update function. The screen update function may mean a function used to update the frame displayed on the display module 160. For example, the screen update function may refer to a function used in operation 714, operation 724, operation 744, operation 754, and/or operation 764 of FIG. 7. For example, the screen update function may include an OnDraw function and/or an update function used for frame update, but this is exemplary and there is no limitation on the screen update function. The invocation time means a point in time at which at least one screen update function is invoked with respect to a reference time. In the following description, for ease of description, an invocation time of the screen update function is 10 ms may mean that a screen update function is invoked 10 ms after an arbitrary reference time, i.e., 0 s. The electronic device 101 identifies the first invocation time and the second invocation time of at least one screen update function may mean identifying a time interval between consecutive invocations of at least one screen update function and may thus mean identifying a reinvocation time of at least one screen update function.

In operation 803, according to various embodiments, the electronic device 101 may identify a first interval between a first invocation time and a second invocation time of at least one screen update function and may compare the first interval with a preset reference range.

In operation 805, according to various embodiments, the electronic device 101 may determine whether the first interval between the first invocation time and the second invocation time of at least one screen update function is included within the preset reference range.

For example, in relation to the interval between invocation times of the screen update function, the preset reference range may be 200 ms to 300 ms. As an example, when the electronic device 101 identifies that the first invocation time of at least one screen update function is 50 ms, and the second invocation time is 150 ms, the electronic device 101 may identify that the first interval between the first invocation time and the second invocation time is 100 ms and may identify that 100 ms identified falls outside the preset reference range from 200 ms to 300 ms. In this case, the electronic device 101 may detect an event for changing the recognition period based on the first interval between the first invocation time and the second invocation time falling outside the preset reference range and perform operation 809. As another example, when the electronic device 101 identifies that the first invocation time of at least one screen update function is 50 ms and the second invocation time is 300 ms, the electronic device 101 may identify that the first interval between the first invocation time and the second invocation time is 250 ms and may identify that 250 ms identified falls within the preset reference range from 200 ms to 300 ms. In this case, the electronic device 101 may determine that no event for changing the recognition period occurs based on the first interval between the first invocation time and the second invocation time falling within the preset reference range and perform operation 807. As another example, when the electronic device 101 identifies that the first invocation time of at least one screen update function is 50 ms, and the second invocation time is 400 ms, the electronic device 101 may identify that the first interval between the first invocation time and the second invocation time is 350 ms and may identify that 350 ms identified falls outside the preset reference range from 200 ms to 300 ms. In this case, the electronic device 101 may detect an event for changing the recognition period based on the first interval between the first invocation time and the second invocation time falling outside the preset reference range and perform operation 809.

In operation 807, according to various embodiments, the electronic device 101 may maintain the recognition period based on the first interval between the first invocation time and the second invocation time of at least one screen update function being included within the preset reference range. For example, if the recognition period of the electronic device 101 before performing operation 801 is the first period, the electronic device 101 may maintain the recognition period as the first period without change in operation 807.

In operation 809, according to various embodiments, the electronic device 101 may change the recognition period based on the first interval between the first invocation time and the second invocation time of at least one screen update function falling outside the preset reference range. For example, if the recognition period of the electronic device 101 before performing operation 801 is the first period, the electronic device 101 may set the recognition period to the second period different from the first period in operation 809. For example, the preset reference range may be 200 ms to 300 ms. As an example, when the electronic device 101 identifies that the first invocation time of at least one screen update function is 50 ms, and the second invocation time is 150 ms, the electronic device 101 may set the recognition period to the second period smaller than the first period based on the first interval, 100 ms (=150 ms−50 ms), between the first invocation time and the second invocation time being smaller than the minimum value, 200 ms, of the preset reference range. As another example, when the electronic device 101 identifies that the first invocation time of at least one screen update function is 50 ms, and the second invocation time is 400 ms, the electronic device 101 may set the recognition period to the second period larger than the first period based on the first interval, 350 ms (=400 ms−50 ms), between the first invocation time and the second invocation time being larger than the maximum value, 300 ms, of the preset reference range. In relation to the size of the recognition period, as an example, when the second period is larger than the first period, this may mean that the second period is numerically larger than the second period. For example, when the second period is 300 ms, and the first period is 200 ms, the second period may be said to be larger than the first period. In relation to the size of the recognition period, as another example, when the second period is larger than the first period, this may mean that the number of recognition operations performed during a predetermined time is larger. For example, when the second period is a period at which one recognition operation is performed every two frame update period, and the first period is a period at which one recognition operation is performed every frame update period, the second period may be said to be larger than the first period. When the second period is smaller than the first period, similar interpretation may apply. When the electronic device 101 sets the recognition period to the second period different from the first period, the size of the set second period is exemplary, and it will be appreciated by one of ordinary skill in the art that the size of the second period may be determined according to an implementation example. For example, the size of the second period may be determined to be proportional to the time interval between the first invocation time and the second invocation time, determined depending on the range in which the time interval between the first invocation time and the second invocation time belongs, or determined according to a preset comparison table, but is not limited thereto.

Figure 9:
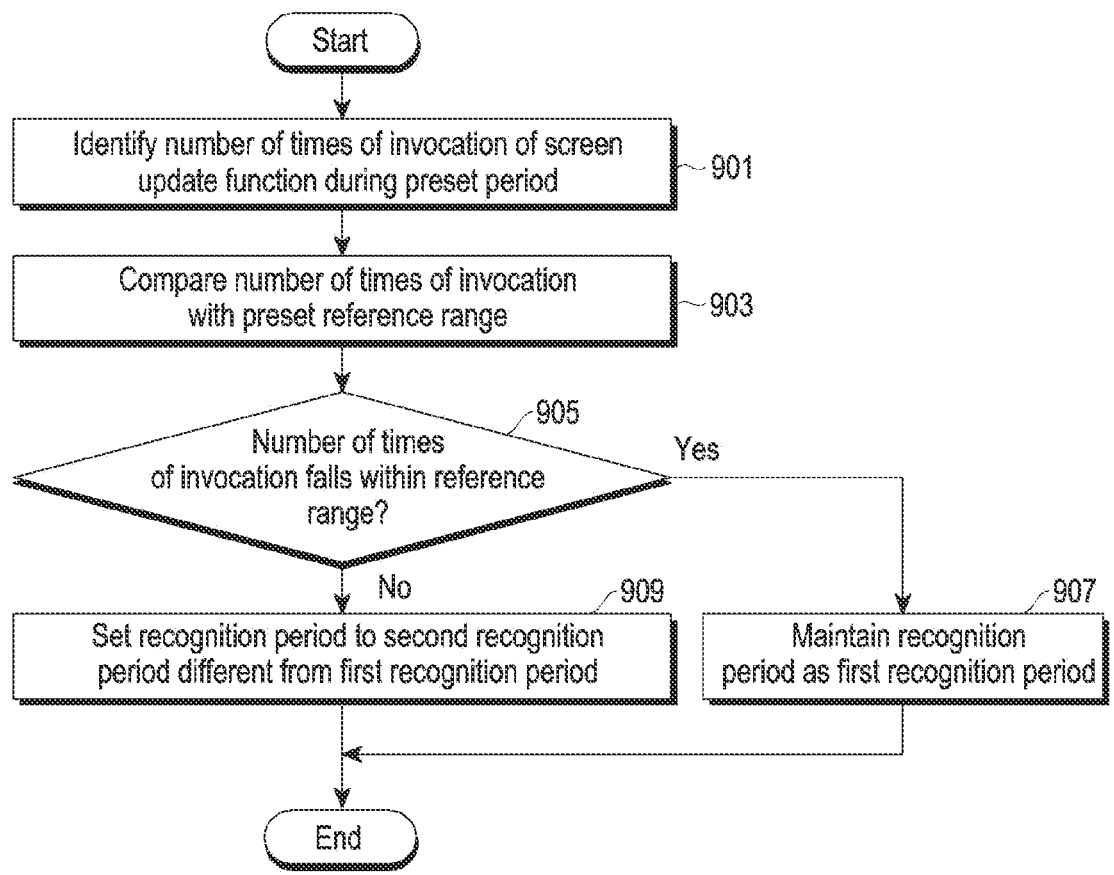
FIG. 9 is a flowchart illustrating an operation method of an electronic device according to various embodiments.

FIG. 9 is a flowchart illustrating an operation method of an electronic device according to various embodiments;

Referring to FIG. 9, in operation 901, according to various embodiments, the electronic device 101 (e.g., the processor 120) may identify the number of invocations of at least one screen update function during a preset period (e.g., one second).

In operation 903, according to various embodiments, the electronic device 101 may compare the number of invocations of at least one screen update function identified during the preset period with a preset reference range.

In operation 905, according to various embodiments, the electronic device 101 may determine whether the number of invocations of at least one screen update function identified during the preset period falls within a preset reference range. For example, the preset reference range may be 15 to 20 per second in relation to the number of invocations of screen update function. As an example, when it is identified that at least one screen update function is invoked 12 times during the preset period, e.g., one second, the electronic device 101 may identify that the 12 times identified falls outside the preset reference range, i.e., 15 to 20. In this case, the electronic device 101 may detect an event for changing the recognition period based on the number of invocations of at least one screen update function identified during the preset period falling outside the preset reference range and perform operation 909. As another example, when the electronic device 101 identifies that at least one screen update function is invoked 18 times during the preset period, i.e., one second, the electronic device 101 may identify that 18 times identified fall within the preset reference range, 15 to 20 times. In this case, the electronic device 101 may determine that no event for changing the recognition period occurs based on the number of invocations of at least one screen update function identified during the preset period falling within the preset reference range and perform operation 907. As another example, when it is identified that at least one screen update function is invoked 22 times during the preset period, e.g., one second, the electronic device 101 may identify that the 22 times identified falls outside the preset reference range, i.e., 15 to 20. In this case, the electronic device 101 may detect an event for changing the recognition period based on the number of invocations of at least one screen update function identified during the preset period falling outside the preset reference range and perform operation 909.

In operation 907, according to various embodiments, the electronic device 101 may maintain the recognition period based on the number of invocation of at least one screen update function identified during the preset period falling within a preset reference range. For example, if the recognition period of the electronic device 101 before performing operation 901 is the first period, the electronic device 101 may maintain the recognition period as the first period without change in operation 907.

In operation 909, according to various embodiments, the electronic device 101 may change the recognition period based on the number of invocation of at least one screen update function identified during the preset period falling outside the preset reference range. For example, if the recognition period of the electronic device 101 before performing operation 901 is the first period, the electronic device 101 may set the recognition period to the second period different from the first period in operation 909. For example, it is assumed that the preset reference range is 15 to 20 per second in relation to the number of invocations of screen update function. As an example, when it is identified that at least one screen update function is invoked 12 times during the preset period, e.g., one second, the electronic device 101 may set the recognition period to the second period larger than the first period based on the 12 times identified being smaller than the minimum value, 15 times, of the preset reference range. As another example, when it is identified that at least one screen update function is invoked 22 times during the preset period, e.g., one second, the electronic device 101 may set the recognition period to the second period smaller than the first period based on the 22 times identified being larger than the maximum value, 20 times, of the preset reference range. When the recognition period is changed, the size of the second period changed may be determined to differ depending on an implementation example as described above in connection with FIG. 8. For example, the size of the second period may be determined to be proportional to the number of invocations of at least one screen update function identified during the preset period, determined depending on the range where the number of invocations belongs, or determined according to a preset comparison table, but is not limited.

Figure 10:
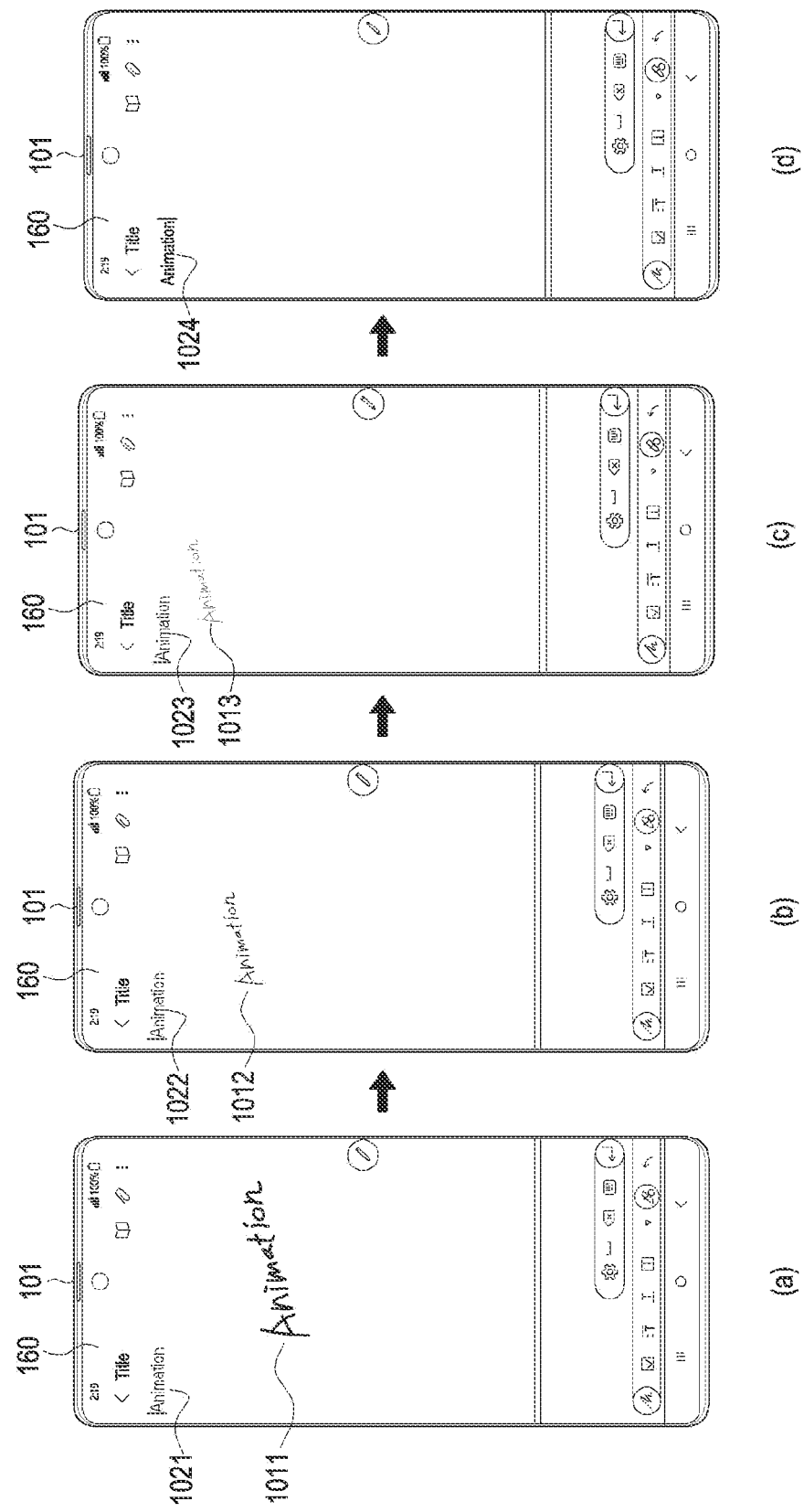
FIG. 10 is a view illustrating an operation method of an electronic device according to various embodiments.

FIG. 10 is a view illustrating an operation method of an electronic device according to various embodiments.

Referring to FIG. 10, according to certain embodiments, the electronic device 101 (e.g., the processor 120) may apply an animation effect between a drawing object (e.g., the drawing object 1011) and text (e.g., the text 1021) displayed in response to a touch input. The animation effect may mean a screen display effect that allows the user to perceive as if the drawing object displayed on the display module 160 moves to the position where the text is displayed. For example, the animation effect may mean that the screens shown in (a), (b), (c), and (d) of FIG. 10 are sequentially displayed. In relation to the animation effect, an example is described below with reference to FIG. 10.

Referring to FIG. 10(a), according to certain embodiments, the electronic device 101 may sense a touch input (e.g., touch input corresponding to "Animation") on the display module 160 and display a first drawing object 1011 (e.g., handwriting object corresponding to "animation") corresponding to the touch input on the display module 160. The electronic device 101 may store stroke data based on the touch input and may perform a recognition operation on the stroke data based on the touch input. The electronic device 101 may display first text 1021 (e.g., text corresponding to "Animation" in designated font) corresponding to the touch input on the display module 160 according to the recognition result of the stroke data. According to certain embodiments, the electronic device 101 may display the screen corresponding to (b) of FIG. 10 after displaying the screen corresponding to (a) of FIG. 10.

Referring to (b) of FIG. 10, according to certain embodiments, the electronic device 101 may display a second drawing object 1012 associated with the first drawing object 1011 between the position where the first drawing object 1011 is displayed and the position where the first text 1021 is displayed in (a) of FIG. 10. The electronic device 101 may continuously display the first text 1021 displayed in (a) of FIG. 10. For convenience, the text continuously displayed in (b) of FIG. 10 may be referred to as second text 1022. According to certain embodiments, the electronic device 101 may display the screen corresponding to (c) of FIG. 10 after displaying the screen corresponding to (b) of FIG. 10.

Likewise, referring to (c) of FIG. 10, according to certain embodiments, the electronic device 101 may display a third drawing object 1013 associated with the second drawing object 1012 between the position where the second drawing object 1012 is displayed and the position where the second text 1022 is displayed in (b) of FIG. 10. The electronic device 101 may continuously display the second text 1022 displayed in (b) of FIG. 10. For convenience, the text continuously displayed in (c) of FIG. 10 may be referred to as third text 1023. According to certain embodiments, the electronic device 101 may display the screen corresponding to (d) of FIG. 10 after displaying the screen corresponding to (c) of FIG. 10.

Finally, referring to FIG. 10(d), according to certain embodiments, the electronic device 101 may display fourth text 1024 in the position where the third text 1023 is displayed in (c) of FIG. 10 without further displaying a drawing object (e.g., the first drawing object 1011, the second drawing object 1012, or the third drawing object 1013) corresponding to the touch input. As an example, the fourth text 1024 may be text having the same attribute as the third text 1023, and as another example, the fourth text 1024 may be text having an attribute different from the third text 1023. The attributes of the text include, but are not limited to, the color of the text, whether the text is underlined, the thickness of the text, whether the text is italicized, or whether the text is highlighted. When the fourth text 1024 is text having the same attribute as the third text 1023, displaying the fourth text 1024 may be understood as continuously displaying the third text 1023. The scheme in which the text is displayed is described in detail with reference to FIGS. 13 and 14.

Referring to (a) to (c) of FIG. 10, according to certain embodiments, the electronic device 101 may display a cursor to the left (or right) of the position where the text (e.g., the first text 1021, the second text 1022, or the third text 1023) is displayed while displaying the drawing object (e.g., the first drawing object 1011, the second drawing object 1012, or the third drawing object 1013). The position of the cursor displayed is exemplary, and the position of the cursor displayed may be determined depending on the set language. Since English is used as an example in the embodiment of FIG. 10, the cursor may be determined to be displayed to the left (or right) of the displayed text in (a) to (c) of FIG. 10 based on the fact that writing in English proceeds from left to right.

Referring to FIG. 10(d), according to certain embodiments, the electronic device 101 may display a cursor to the right (or left) of the position where the fourth text 1024 is displayed. As described above, the position where the cursor is displayed may be determined depending on the set language, but is not limited.

Figure 11:
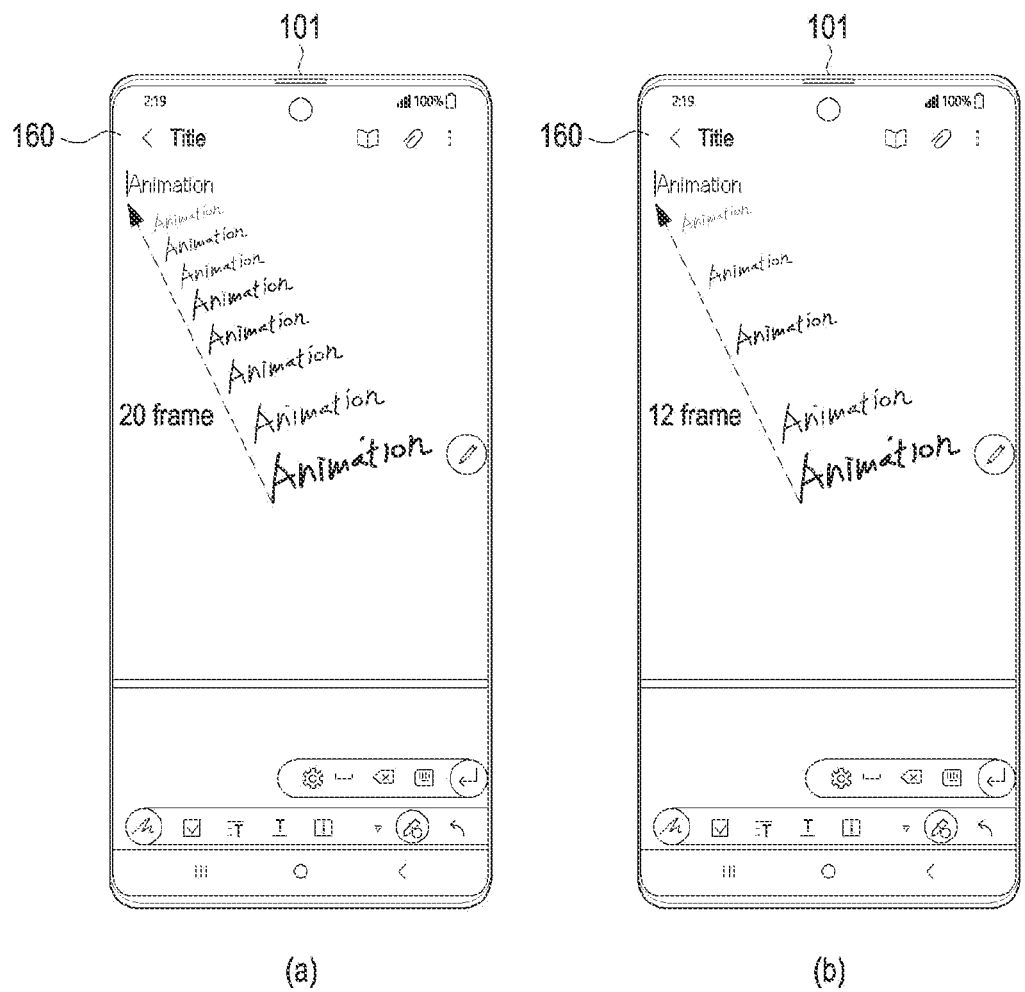
FIG. 11 is a view illustrating an operation method of an electronic device according to various embodiments.

FIG. 11 is a view illustrating an operation method of an electronic device according to various embodiments. FIG. 11 is described with reference to FIGS. 10 and 9.

Referring to FIG. 11, according to certain embodiments, the electronic device 101 (e.g., the processor 120) may set a recognition period based on the number of frames updated according to the animation effect applied between the drawing object and text displayed in response to a touch input. For example, the electronic device 101 may identify the number of frames updated according to the animation effect by identifying the number of invocations of the screen update function invoked to apply the animation effect.

Referring to (a) of FIG. 11, according to certain embodiments, in a case where a preset number (e.g., 20) of frame updates (or in a preset number range (e.g., 18 times to 22 times) are predicted during a preset period (e.g., one second) to apply the animation effect, the electronic device 101 may maintain the recognition period as the existing first period based on identifying that the number of frames updated according to the animation effect corresponds to a preset number of times (or a number within a preset range) (e.g., based on the number of frames actually updated during a predetermined period to apply the animation effect being 20).

Referring to (b) of FIG. 11, according to certain embodiments, in a case where a preset number (e.g., 20) of frame updates (or in a preset number range (e.g., 18 times to 22 times) are predicted during a preset period (e.g., one second)

to apply the animation effect, the electronic device 101 may set the recognition period to the second period different from the existing first period based on identifying that the number of frames updated according to the animation effect does not correspond to a preset number of times (or a number within a preset range) (e.g., based on the number of frames actually updated during a predetermined period to apply the animation effect being 12 or 24). The embodiment of setting the recognition period by identifying the number of invocations of screen update function, the embodiment of maintaining the recognition period as the existing first period, and the embodiment of determining the size of the second period set as the recognition period have been described above in connection with FIG. 8 and/or FIG. 9, and no duplicate description is given.

Figure 12:
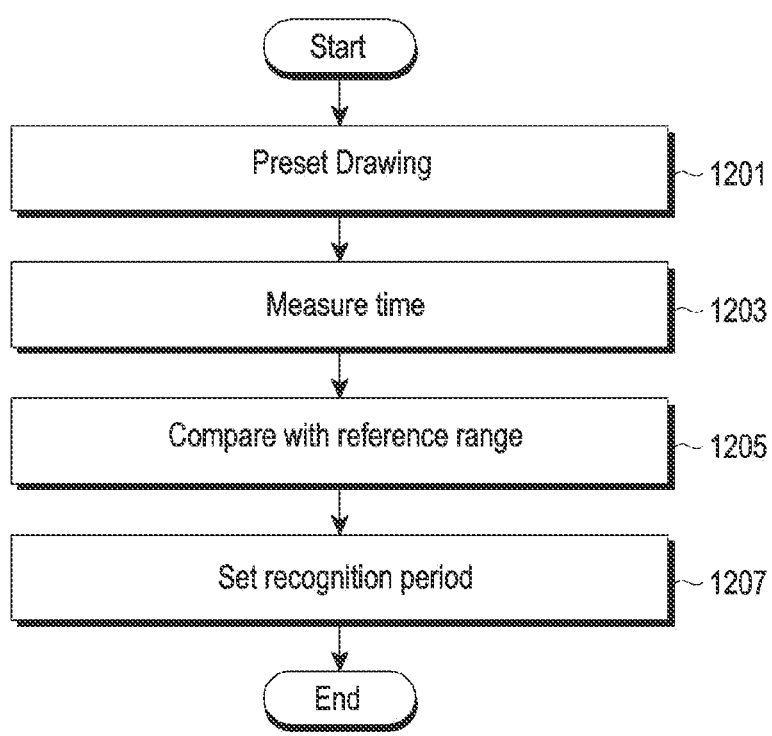
FIG. 12 is a view illustrating an operation method of an electronic device according to various embodiments.

FIG. 12 is a view illustrating an operation method of an electronic device according to various embodiments.

According to various embodiments, referring to FIG. 12, in operation 1201, the electronic device 101 (e.g., the processor 120) may perform the operation of displaying a preset straight line or curve, which may be referred to as a preset drawing operation. For example, the electronic device 101 may display a straight line, a polygon, or a curve, which has a path with several preset points, on the display module 160. The electronic device 101 may measure the time taken for the preset drawing operation (operation 1203) and compare the measured time with a reference range (operation 1205). The electronic device 101 may set a recognition period based on a result of comparison in operation 1205 (operation 1207). A method for setting a recognition period may be appreciated in a similar manner to the above-described embodiment of FIG. 8.

Figure 13:
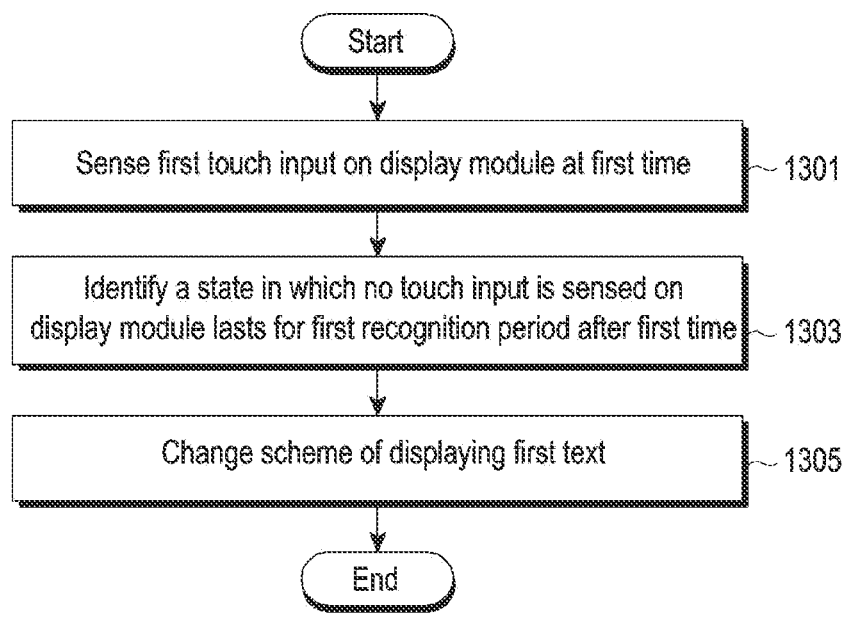
FIG. 13 is a flowchart illustrating an operation method of an electronic device according to various embodiments.
Figure 14:
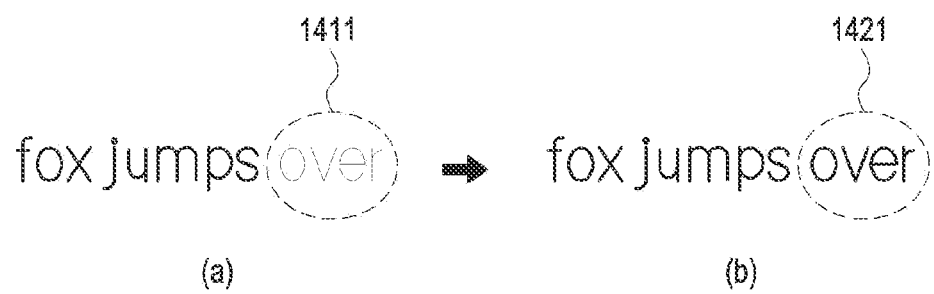
FIG. 14 is a view illustrating an operation method of an electronic device according to various embodiments.

FIG. 13 is a flowchart illustrating an operation method of an electronic device according to various embodiments; FIG. 13 is described with reference to FIG. 14. FIG. 14 is a view illustrating an operation method of an electronic device according to various embodiments.

Referring to FIG. 13, in operation 1301, according to various embodiments, the electronic device 101 (e.g., the processor 120) may sense a first touch input (e.g., touch input corresponding to "over") on the display module 160 at a first time. Thereafter, the electronic device 101 may display first text (e.g., the first text 1411 (e.g., text corresponding to "over" in designated font) of FIG. 14(*a*)) corresponding to the first touch input.

In operation 1303, according to various embodiments, the electronic device 101 may identify that the state in which no touch input is sensed on the display module 160 lasts for a preset period after the first time. For example, the electronic device 101 may sense the first touch input in operation 1301 and may identify that no other touch input is sensed on the display module 160 during a preset period (e.g., text update period) after a time when a touch-up event of the first touch input is identified. The preset period (e.g., text update period) may be changed while the electronic device 101 operates but is not limited thereto. The text update period is described in detail with reference to FIGS. 15 to 20.

In operation 1305, according to various embodiments, the electronic device 101 may change the scheme of displaying the first text (e.g., the first text 1411 of FIG. 14(*a*)) based on the state in which no touch input is sensed on the display module 160 lasting for a preset period after the first time. For example, the electronic device 101 may stop displaying the first text (e.g., the first text 1411 of FIG. 14(*a*)) and display second text (e.g., the second text 1421 of FIG. 14) in the position where the first text used to be displayed.

In operation 1305, a configuration of changing the scheme of displaying text is described below as an example. As an example, in (a) of FIG. 14, the first text 1411 may be displayed in a first color (e.g., gray) and, in (b) of FIG. 14, the second text 1421 may be displayed in a second color (e.g., black) in the position where the first text 1411 used to be displayed. As other examples, the underlining of text can be changed, the thickness of the text can be changed, the italicizing of text can be changed, or the highlighting of text can be changed, the scheme of displaying the text may be changed, but changing the scheme of displaying the text is not limited thereto.

"Text update period" may mean a period in which previously displayed text may be updated. As an example, referring to FIG. 14 described above, the text update period may mean the time taken for the first text 1411, which used to be displayed in a first attribute (e.g., the attribute in which the color is gray), to be changed into the second text 1421 having a second attribute (e.g., the attribute in which the color is black) and displayed. As another example, referring to FIGS. 15 and 16 described below, if a second touch input is made within a "preset period" after the first touch input is made, a recognition operation may be performed, with the first touch input and the second touch input associated with each other and, in this case, the "preset period" may be referred to as a text update period.

Figure 15:
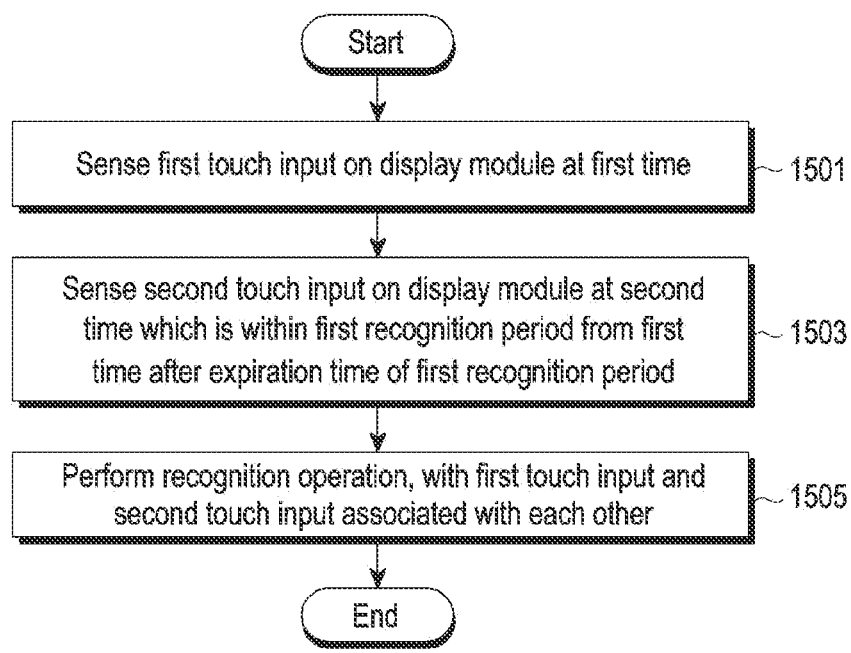
FIG. 15 is a flowchart illustrating an operation method of an electronic device according to various embodiments.
Figure 16:
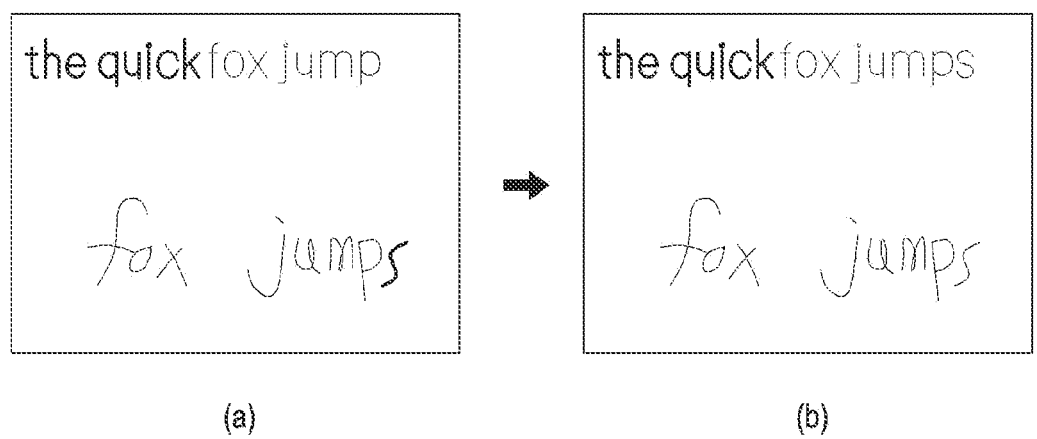
FIG. 16 is a view illustrating an operation method of an electronic device according to various embodiments.

FIG. 15 is a flowchart illustrating an operation method of an electronic device according to various embodiments. FIG. 15 is described with reference to FIG. 16. FIG. 16 is a view illustrating an operation method of an electronic device according to various embodiments.

Referring to FIG. 15, in operation 1501, according to various embodiments, the electronic device 101 (e.g., the processor 120) may sense a first touch input (e.g., touch input corresponding to "fox jump") on the display module 160 at a first time. Thereafter, the electronic device 101 may display a first drawing object (e.g., handwriting object corresponding to "fox jump" of FIG. 16(*a*)) corresponding to the first touch input and display first text (e.g., text corresponding to "fox jump" in designated font of FIG. 16(*a*)) corresponding to the first touch input.

In operation 1503, according to various embodiments, the electronic device 101 may sense a second touch input (e.g., touch input corresponding to "s") on the display module 160 at a second time which is within a preset period (e.g., the first period or text update period) from a first time (e.g., the first time when the first touch input is sensed in operation 1501) after the expiration time of the recognition period (e.g., the first period). For example, the electronic device 101 may sense the second touch input (e.g., touch input corresponding to "s") at the second time which is before the text update period elapses from the first time when the first touch input is sensed although the recognition operation on the first touch input (e.g., touch input corresponding to "fox jump") is performed as the expiration time of the recognition period elapses and the first text (e.g., text corresponding to "fox jump" in designated font of FIG. 16(*a*)) corresponding to the first touch input is displayed. Thereafter, the electronic device 101 may display the second drawing object (e.g., handwriting object corresponding to "s" of FIG. 16(*a*)) corresponding to the second touch input.

In operation 1505, according to various embodiments, the electronic device 101 may perform a recognition operation, with the first touch input and the second touch input associated with each other, based on the second time being within a preset period (e.g., text update period) from the first time. Performing a recognition operation with the first touch input and the second touch input associated with each other may mean that a recognition operation is simultaneously performed on first stroke data corresponding to the first touch input and second stroke data corresponding to the second touch input. For example, referring to (b) of FIG. 16, the electronic device 101 may perform a recognition operation on the first stroke data corresponding to the first touch input (e.g., touch input corresponding to "fox jump") and the second stroke data corresponding to the second touch input (e.g., touch input corresponding to "s") and, according to a result of recognition, display text (e.g., text corresponding to "fox jump" in designated font of FIG. 16(b)).

Figure 17:
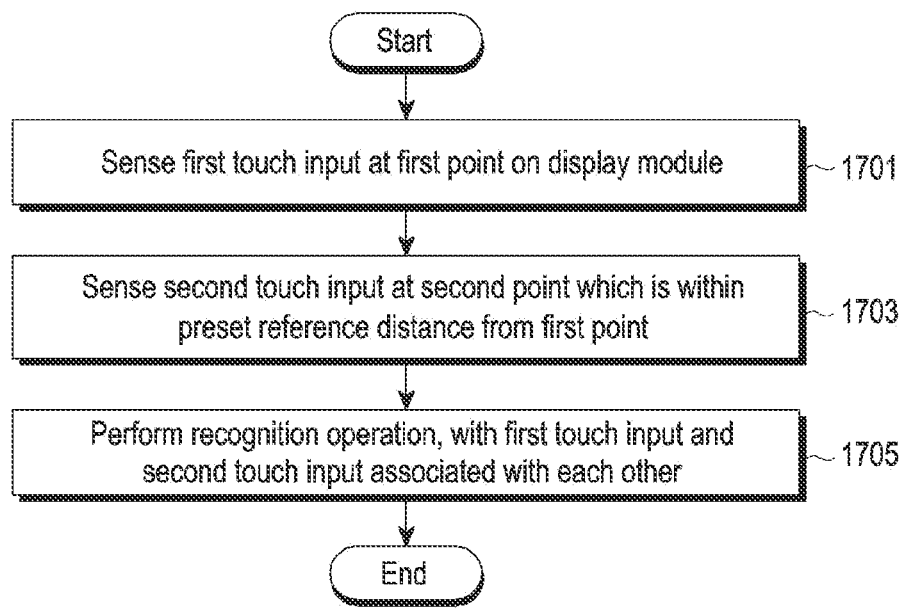
FIG. 17 is a flowchart illustrating an operation method of an electronic device according to various embodiments.
Figure 18:
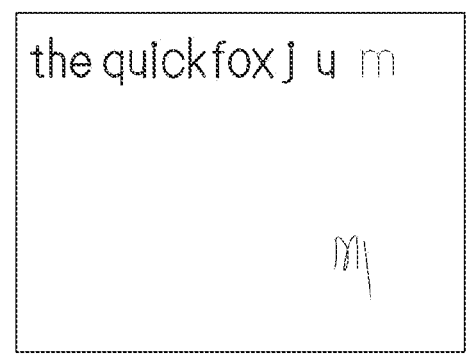
FIG. 18 is a view illustrating an operation method of an electronic device according to various embodiments.

FIG. 17 is a flowchart illustrating an operation method of an electronic device according to various embodiments. FIG. 17 is described with reference to FIGS. 16 and 18. FIG. 18 is a view illustrating an operation method of an electronic device according to various embodiments.

Referring to FIG. 17, in operation 1701, according to various embodiments, the electronic device 101 (e.g., the processor 120) may sense a first touch input (e.g., touch input corresponding to "jump" in FIG. 16(a)) at a first point on the display module 160. Thereafter, the electronic device 101 may display a first drawing object (e.g., handwriting object corresponding to "jump" of FIG. 16(a)) corresponding to the first touch input and display first text (e.g., text corresponding to "jump" in designated font of FIG. 16(a)) corresponding to the first touch input.

In operation 1703, according to various embodiments, the electronic device 101 may sense a second touch input (e.g., touch input corresponding to "s" in (a) of FIG. 16) at a second point which is within a preset reference distance from the first point. Thereafter, the electronic device 101 may display the second drawing object (e.g., handwriting object corresponding to "s" of FIG. 16(a)) corresponding to the second touch input.

In operation 1705, according to various embodiments, the electronic device 101 may perform a recognition operation, with the first touch input and the second touch input associated with each other, based on the first point and the second point being within the preset reference distance. A configuration of performing a recognition operation with the first touch input and the second touch input associated with each other and displaying text according to a result of recognition may be understood in a similar manner to the description of operation 1505.

According to certain embodiments, unlike FIG. 16, FIG. 18 illustrates that, rather than performing a recognition operation with a plurality of touch inputs associated with each other, each recognition operation is performed on each touch input, so that each text corresponding to each touch input is displayed as separate text. Referring to FIG. 18, when each recognition operation is performed on each touch input, each text corresponding to each touch input may be displayed in separate text (e.g., text in which "j," "u," and "m" are separated by spaces), rather than displaying continuous text (e.g., text composed of one word without space, such as "jum").

Figure 19:
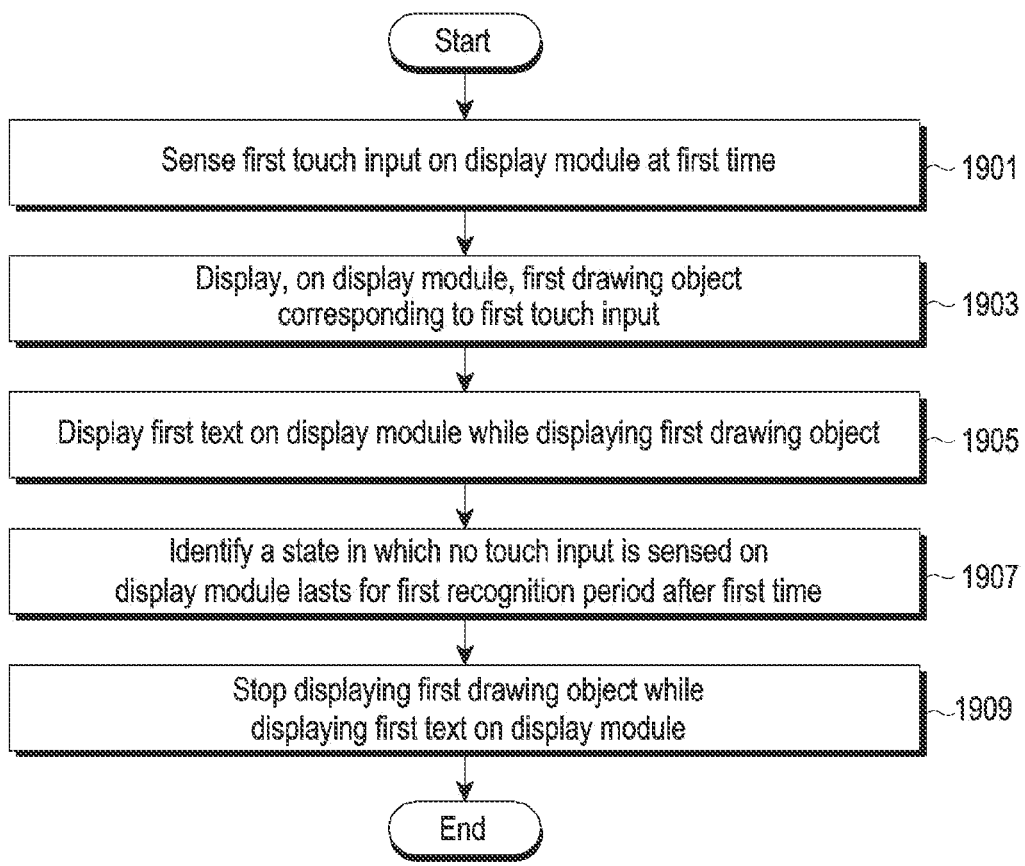
FIG. 19 is a flowchart illustrating an operation method of an electronic device according to various embodiments.
Figure 20:
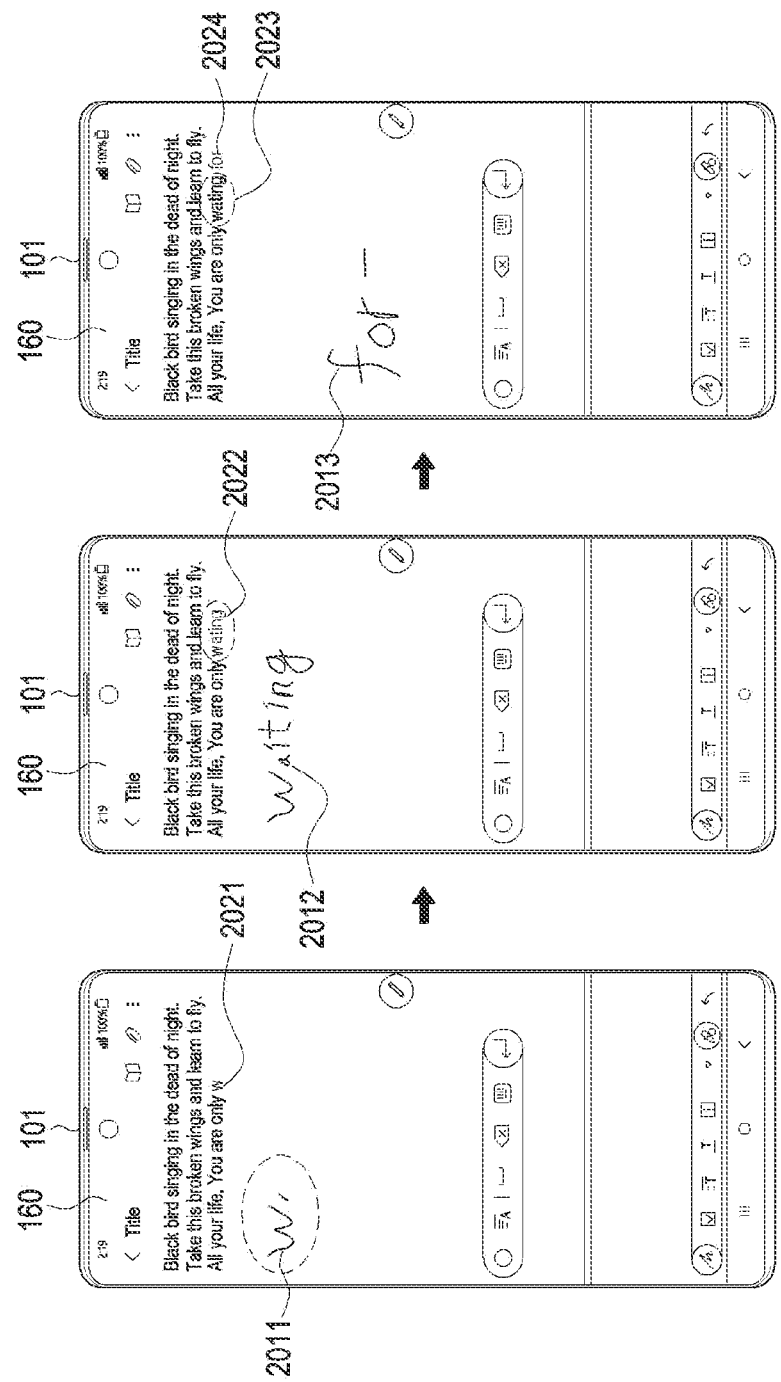
FIG. 20 is a view illustrating an operation method of an electronic device according to various embodiments.

FIG. 19 is a flowchart illustrating an operation method of an electronic device according to various embodiments. FIG. 19 is described with reference to FIG. 20. FIG. 20 is a view illustrating an operation method of an electronic device according to various embodiments.

Referring to FIG. 19, in operation 1901, according to various embodiments, the electronic device 101 (e.g., the processor 120) may sense a first touch input (e.g., touch input corresponding to "waiting" in FIG. 20) on the display module 160 at a first time.

In operation 1903, according to various embodiments, the electronic device 101 may display, on the display module 160, a first drawing object (e.g., the first drawing object 2012 (e.g., "waiting"-shaped handwriting object) of FIG. 20) corresponding to the first touch input (e.g., touch input corresponding to "waiting" in FIG. 20).

In operation 1905, according to various embodiments, the electronic device 101 may display, on the display module 160, first text (e.g., the first text 2022 (e.g., text corresponding to "waiting" in designated font)) corresponding to the first touch input while displaying the first drawing object (e.g., the first drawing object 2012 (e.g., "waiting"-shaped handwriting object) of FIG. 20).

In operation 1907, according to various embodiments, the electronic device 101 may identify that the state in which no touch input is sensed on the display module 160 lasts for a first period after the first time. For example, referring to (b) and (c) of FIG. 20, when the touch input corresponding to "waiting" is sensed at a first time, and the next touch input, e.g., touch input corresponding to "for," is sensed at a second time, if the time interval between the first time (e.g., the end time of the touch input corresponding to "waiting", and the time when a touch-up event is identified) and the second time (e.g., the start time of the touch input corresponding to "for" and the time when a touch-down event is identified) is larger than the first period, the electronic device 101 may identify that the state in which no touch input is sensed on the display module 160 after the first time lasts for the first period.

In operation 1909, according to various embodiments, the electronic device 101 may stop displaying the first drawing object (e.g., the first drawing object 2012 (e.g., "waiting"-shaped handwriting object) of FIG. 20) while displaying the first text on the display module 160 based on the state in which no touch input is sensed on the display module 160 lasting for the first period after the first time. In this case, the first text displayed on the display module 160 may be the existing first text 2022 used to be displayed as in (b) of FIG. 20 or may be the second text 2023 newly displayed in the position where the first text 2022 used to be displayed as in (c) of FIG. 20. The first text 2022 and the second text 2023 have different text attributes which have been described above in connection with FIGS. 10, 13, and 14.

According to various embodiments, referring to FIG. 20, the electronic device 101 may sense a touch input corresponding to "w" in (a) of FIG. 20 and display, on the display module 160, a drawing object 2011 (e.g., "w"-shaped handwriting object) corresponding to the touch input corresponding to "w." The electronic device 101 may display, on the display module 160, the text 2021 (e.g., text corresponding to "w" in designated font) corresponding to the touch input corresponding to "w" while displaying the drawing object 2011. Thereafter, the electronic device 101 may sense the touch input corresponding to "a" in (b) of FIG. 20. In this case, the electronic device 101 may continuously display the drawing object 2011 (e.g., "w"-shaped handwriting object) corresponding to the touch input corresponding to "w" based on the time interval between the input time of the touch input corresponding to "w" and the input time of the touch input corresponding to "a" being smaller than (or equal to or smaller than) a preset time interval (e.g., the first period). Sensing the touch input corresponding to "for" and displaying the drawing object 2013 (e.g., "for"-shaped handwriting object) and text 2024 (e.g., text corresponding to "for" in designated font) in (c) of FIG. 20 may be appreciated in a similar manner to the description of FIGS. 19 and 20.

Figure 21:
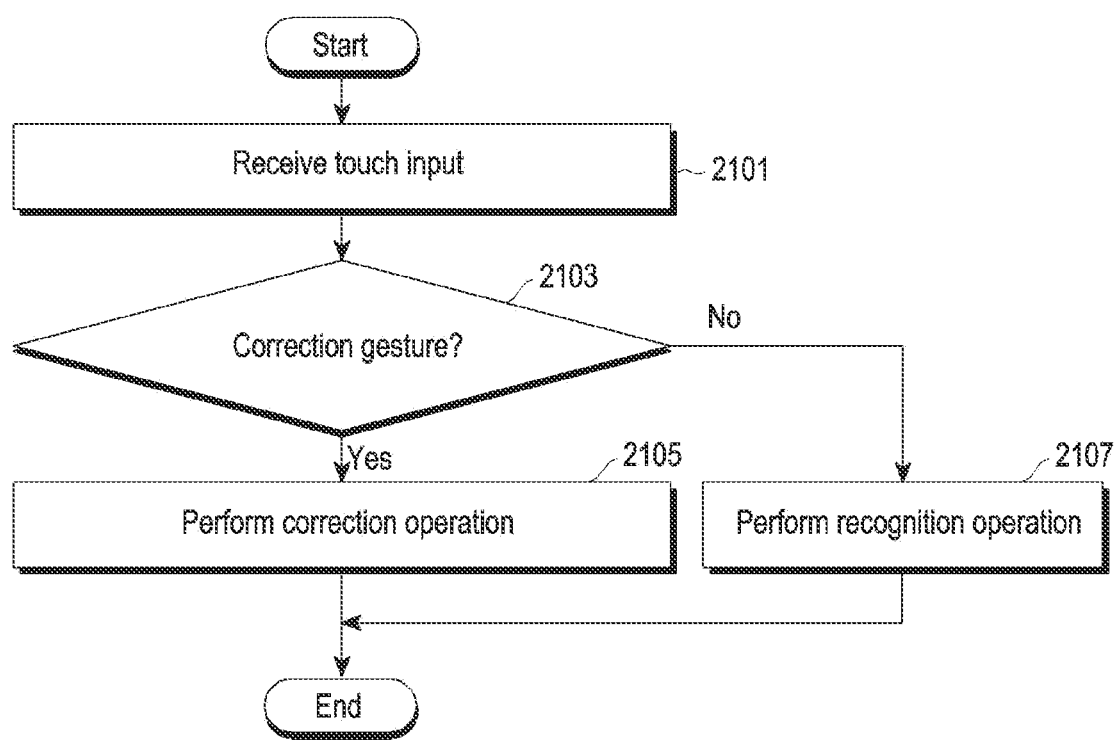
FIG. 21 is a flowchart illustrating an operation method of an electronic device according to various embodiments.

FIG. 21 is a flowchart illustrating an operation method of an electronic device according to various embodiments.

Referring to FIG. 21, in operation 2101, according to various embodiments, the electronic device 101 (e.g., the processor 120) may receive a first touch input. Thereafter, the electronic device 101 may display a first drawing object corresponding to the first touch input.

In operation 2103, according to various embodiments, the electronic device 101 may determine whether the received first touch input is a correction gesture. Correction gesture may mean a gesture used for a correction operation. For example, when the received touch input is not a touch input, as a target for recognition operation such as the touch input disclosed in the above-described embodiment of FIGS. 5 to 20, but a touch input used to correct already displayed text, this touch input may be referred to as a correction gesture. As another example, when the received touch input is the same as the existing one in that it is a target for recognition operation but is also used to correct already displayed text, the touch input may also be called correction gesture. For example, the electronic device 101 may determine whether the received touch input is a correction gesture based on the position where the touch input is sensed on the display module 160, whether text is being displayed in the position where the touch input is sensed, and/or whether there is stroke data on which a recognition operation has not been yet performed.

In operation 2105, according to various embodiments, the electronic device 101 may perform a correction operation associated with the first touch input based on determining that the received first touch input is a correction gesture. The correction operation is described below with reference to FIG. 22.

In operation 2107, according to various embodiments, the electronic device 101 may perform a recognition operation on the first touch input based on determining that the received first touch input is not a correction gesture. The recognition operation has been described above with reference to FIGS. 5 to 20.

FIG. 22 is a view illustrating an operation method of an electronic device according to various embodiments.

Referring to FIG. 22, a correction operation of the electronic device 101 is described below.

As an example, the electronic device 101 may sense a touch input (e.g., touch input corresponding to "g") in the position where the last text "n" is displayed among the positions where the text corresponding to "Samsunn" is displayed and display a drawing object corresponding to the touch input. In this case, the electronic device 101 may determine that the touch input is a correction gesture and stop displaying "n" which is being displayed and may display the text corresponding to "g" based on the sensed touch input.

As another example, the electronic device 101 may sense a touch input (e.g., touch input corresponding to a horizontal line) in the position where "sung" is displayed among the positions where the text corresponding to "Samsung" is displayed and display a drawing object corresponding to the touch input. In this case, the electronic device 101 may determine that the touch input is a correction gesture and stop displaying "sung", which is being displayed.

As another example, the electronic device 101 may sense a touch input (e.g., touch input corresponding to a random line which is repeated up and down or left and right in the corresponding area) in the position where "sung" is displayed among the positions where the text corresponding to "Samsung" is displayed and display a drawing object corresponding to the touch input. In this case, the electronic device 101 may determine that the touch input is a correction gesture and stop displaying "sung" which is being displayed.

As another example, the electronic device 101 may sense a touch input (e.g., touch input corresponding to a strike-through symbol) in the position where "g" is displayed among the positions where the text corresponding to "Samsung" is displayed and display a drawing object corresponding to the touch input. In this case, the electronic device 101 may determine that the touch input is a correction gesture and stop displaying "g" which is being displayed.

As another example, the electronic device 101 may sense a touch input (e.g., touch input corresponding to a vertical line) in the middle of the position where "n" and "g" are displayed among the positions where the text corresponding to "Samsung" is displayed and display a drawing object corresponding to the touch input. In this case, the electronic device 101 may determine that the touch input is a correction gesture and display "n" and "g," which are being displayed," with a space therebetween.

As another example, the electronic device 101 may sense a touch input (e.g., touch input corresponding to a correction symbol to add "s") between the positions where "m" and "u" are displayed among the positions where the text corresponding to "Samung" is displayed and display a drawing object corresponding to the touch input. In this case, the electronic device 101 may determine that the touch input is a correction gesture and insert "s" between "m" and "u" and display the corrected text.

As another example, the electronic device 101 may sense a touch input (e.g., touch input corresponding to a put-together correction symbol) between the positions where the text corresponding to "Sam" and "sung" is displayed and display a drawing object corresponding to the touch input. In this case, the electronic device 101 may determine that the touch input is a correction gesture and put together and display "Sam" and "sung," which are being displayed."

Figure 23:
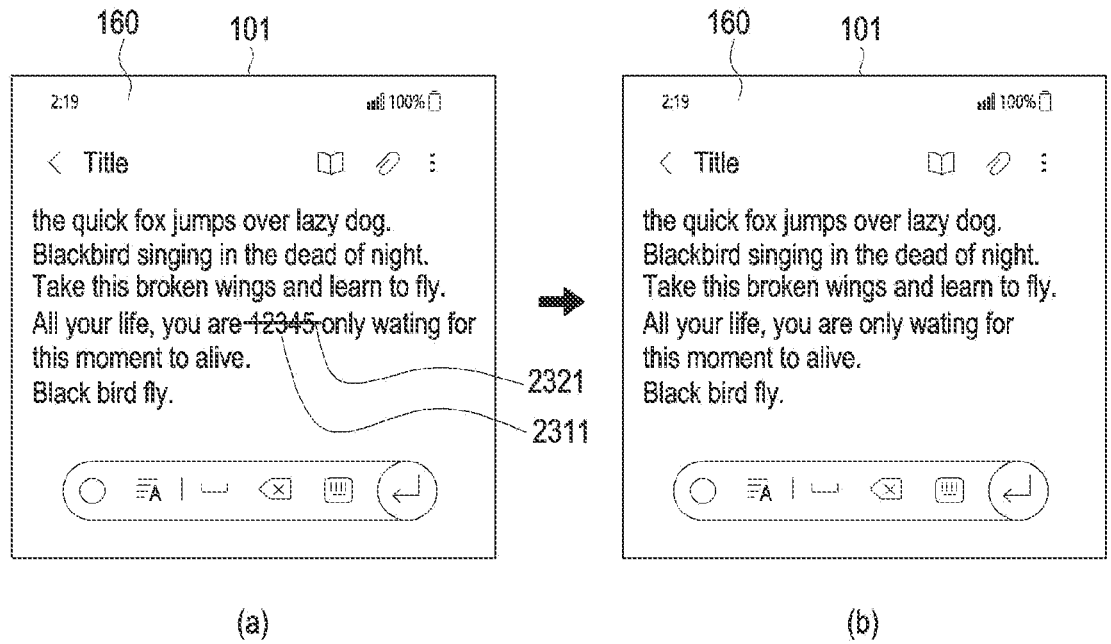
FIG. 23 is a view illustrating an operation method of an electronic device according to various embodiments.

FIG. 23 is a view illustrating an operation method of an electronic device according to various embodiments.

Referring to FIG. 23, the electronic device 101 (e.g., the processor 120) may stop displaying the target text (e.g., text corresponding to "12345") based on identifying the correction gesture 2321 (e.g., touch input corresponding to a strike-through correction symbol) in the position where the text 2311 (e.g., text corresponding to "12345") on the display module 160 and reposition and display the remaining text.

Figure 24:
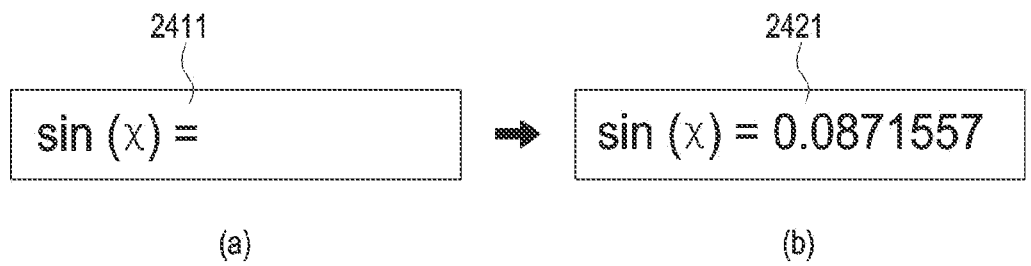
FIG. 24 is a view illustrating an operation method of an electronic device according to various embodiments.

FIG. 24 is a view illustrating an operation method of an electronic device according to various embodiments.

Referring to FIG. 24, when the text displayed in response to the sensed touch input is a designated symbol, the electronic device 101 (e.g., the processor 120) may perform an operation associated with the designated symbol. For example, when the text displayed in response to the sensed touch input is a symbol corresponding to "=," the electronic device 101 may perform associated calculation and display a result of the calculation. In (a) of FIG. 24, the electronic device 101 may sense the touch input corresponding to "=" to the right of the position where "sin(x)" is displayed and display a symbol 2411 corresponding to "=." In (b) of FIG. 24, the electronic device 101 may perform calculation on "sin(x)" based on the text displayed in response to the sensed touch input being a symbol 2411 corresponding to "=" and display the text 2421 corresponding to the result of calculation, i.e., "0.0871557."

Figure 25:
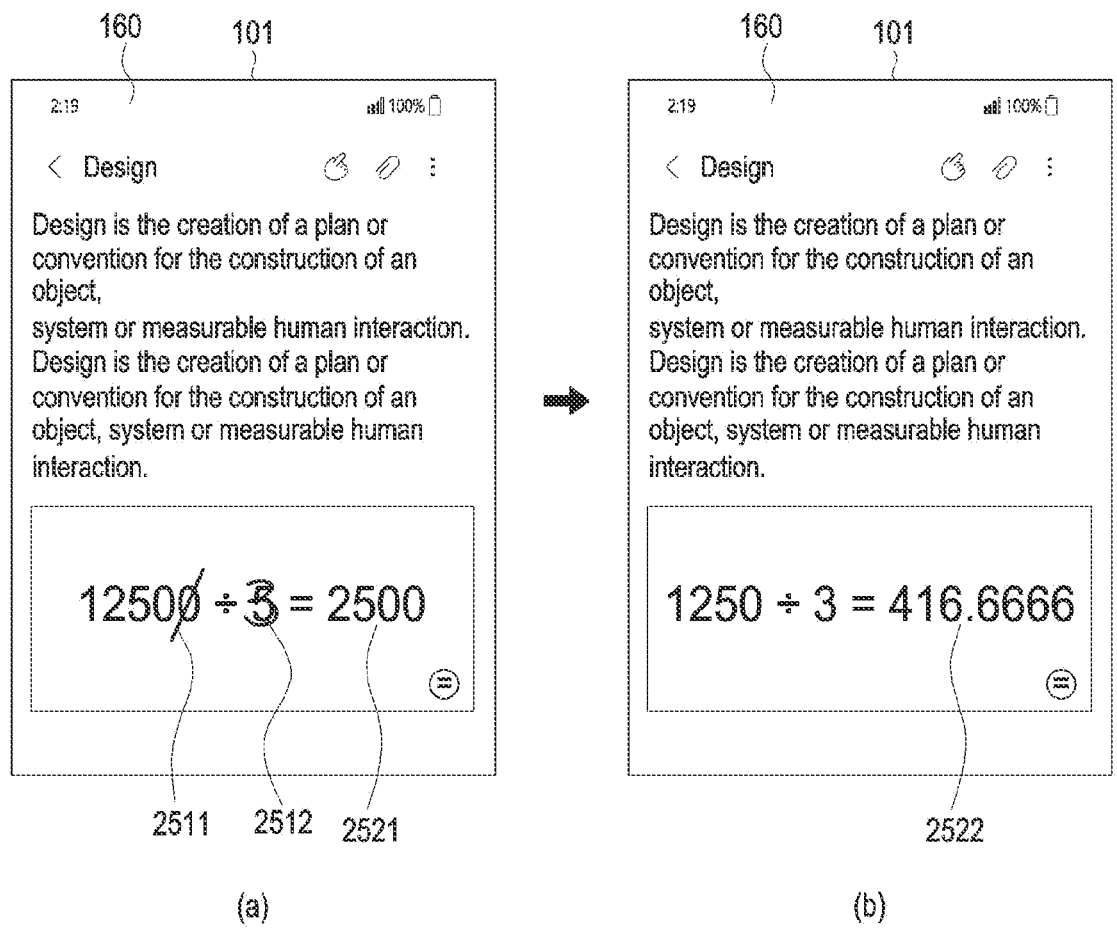
FIG. 25 is a view illustrating an operation method of an electronic device according to various embodiments.

FIG. 25 is a view illustrating an operation method of an electronic device according to various embodiments.

Referring to FIG. 25, the electronic device 101 (e.g., the processor 120) may again perform calculation based on a correction gesture (e.g., 2511 and 2512), stop displaying the text 2521 corresponding to the existing calculation result "2500" and display the text 2522 corresponding to "416.6666" which is the result of the calculation performed again.

Figure 26:
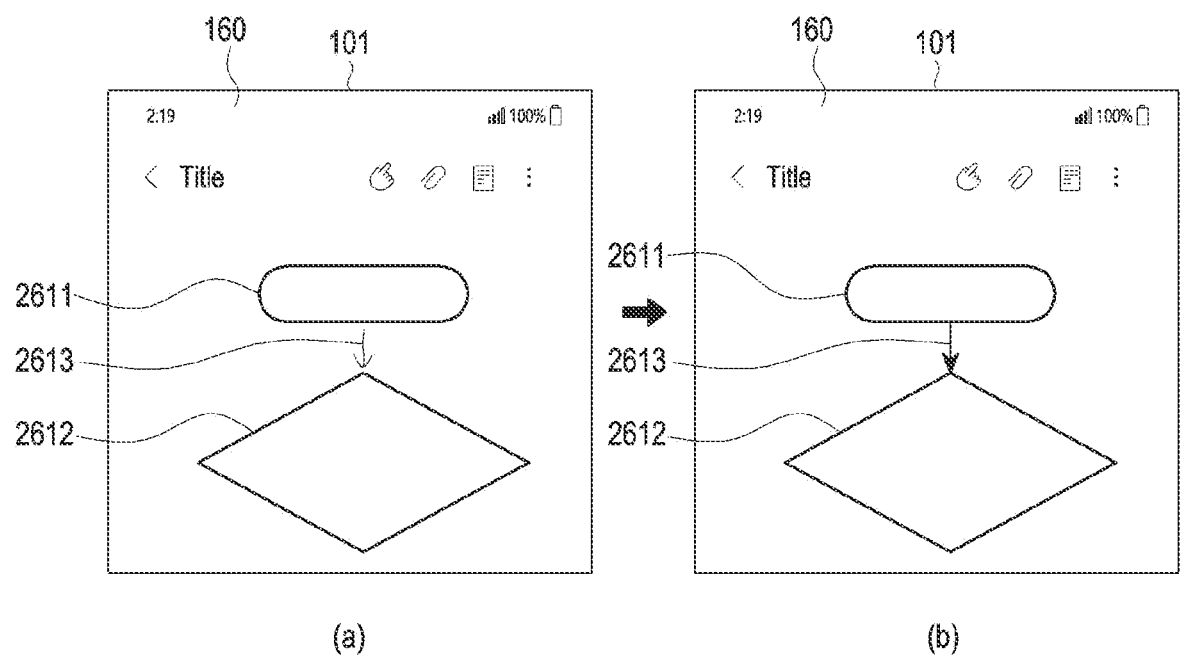
FIG. 26 is a view illustrating an operation method of an electronic device according to various embodiments.

FIG. 26 is a view illustrating an operation method of an electronic device according to various embodiments.

Referring to (a) of FIG. 26, the electronic device 101 (e.g., the processor 120) may sense a touch input (e.g., touch input corresponding to an arrow) between a first FIG. 2611 and a second FIG. 2612 previously displayed and display a drawing object 2613 corresponding to the sensed touch input. Thereafter, the electronic device 101 may recognize the touch input (e.g., touch input corresponding to the arrow) based on positional characteristics between the displayed drawing object 2613 and the pre-displayed figures (e.g., the first FIG. 2611 and the second FIG. 2612). Referring to (b) of FIG. 26, the electronic device 101 may display the "arrow" FIG. 2613 corresponding to the touch input as a connection line connecting the pre-displayed first FIG. 2611 and second FIG. 2612, according to the result of recognition of the touch input.

Figure 27:
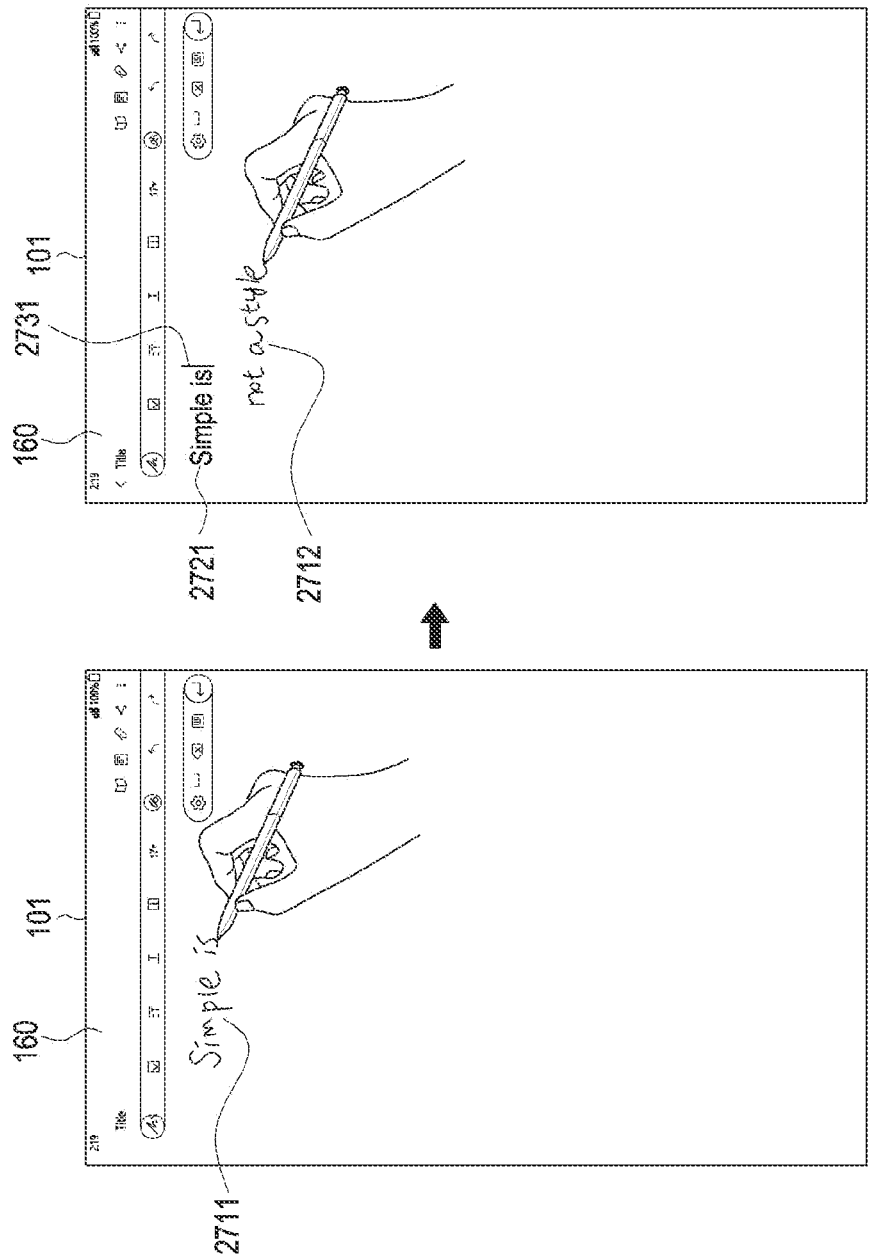
FIG. 27 is a view illustrating an operation method of an electronic device according to various embodiments.
Figure 28:
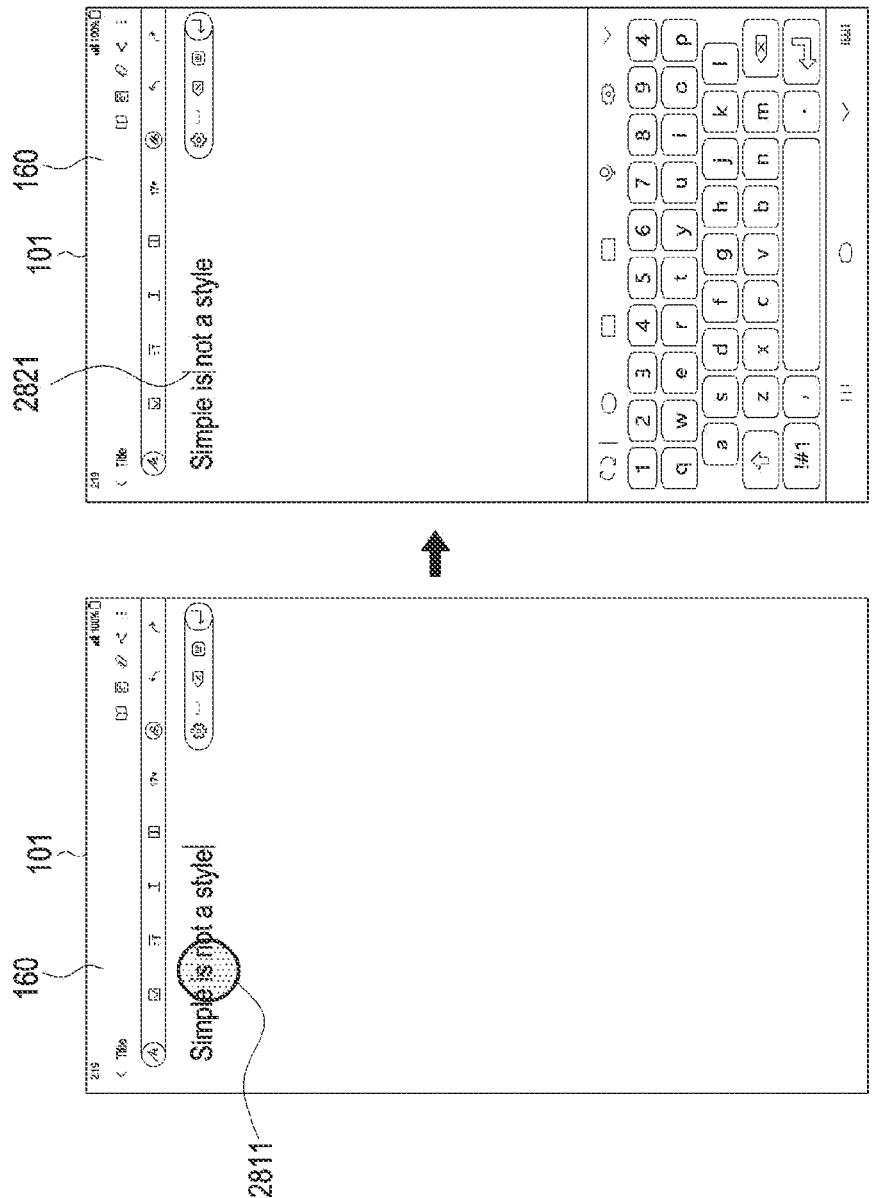
FIG. 28 is a view illustrating an operation method of an electronic device according to various embodiments.

FIG. 27 is a view illustrating an operation method of an electronic device according to various embodiments. FIG. 27 is described with reference to FIG. 28. FIG. 28 is a view illustrating an operation method of an electronic device according to various embodiments.

Referring to FIG. 27, in (a) of FIG. 27, the electronic device 101 (e.g., the processor 120) may sense a first touch input (e.g., touch input corresponding to "Simple is") and display a first drawing object 2711 (e.g., handwriting object corresponding to "Simple is") corresponding to the first touch input. Thereafter, in (b) of FIG. 27, the electronic device 101 may display first text 2721 (e.g., text corresponding to "Simple is" in designated font) corresponding to the first touch input and display a cursor 2731 to the right of the first text 2721. Thereafter, the electronic device 101 may sense a second touch input (e.g., touch input corresponding to "not a style") and display a second drawing object 2712 (e.g., handwriting object corresponding to "not a style") corresponding to the second touch input. Thereafter, the electronic device 101 may display second text (e.g., text corresponding to "not a style" in designated font) corresponding to the second touch input in the position where the cursor 2731 is displayed, finally displaying the screen of FIG. 28(a). Thereafter, the electronic device 101 may sense a touch input 2811 in the area between the positions where the text corresponding to "Simple is" and "not a style" is displayed in (a) of FIG. 28. In this case, the touch input 2811 may be a tap input or long-press input. Thereafter, the electronic device 101 may display a cursor 2821 in the area between the positions where the text corresponding to "Simple is" and "not a style" is displayed in (b) of FIG. 28. Thereafter, the electronic device 101 may insert text corresponding to a user input made through a virtual keyboard or text based on the result of recognition of the touch input, in the position where the cursor 2821 is displayed and display it.

Figure 29:
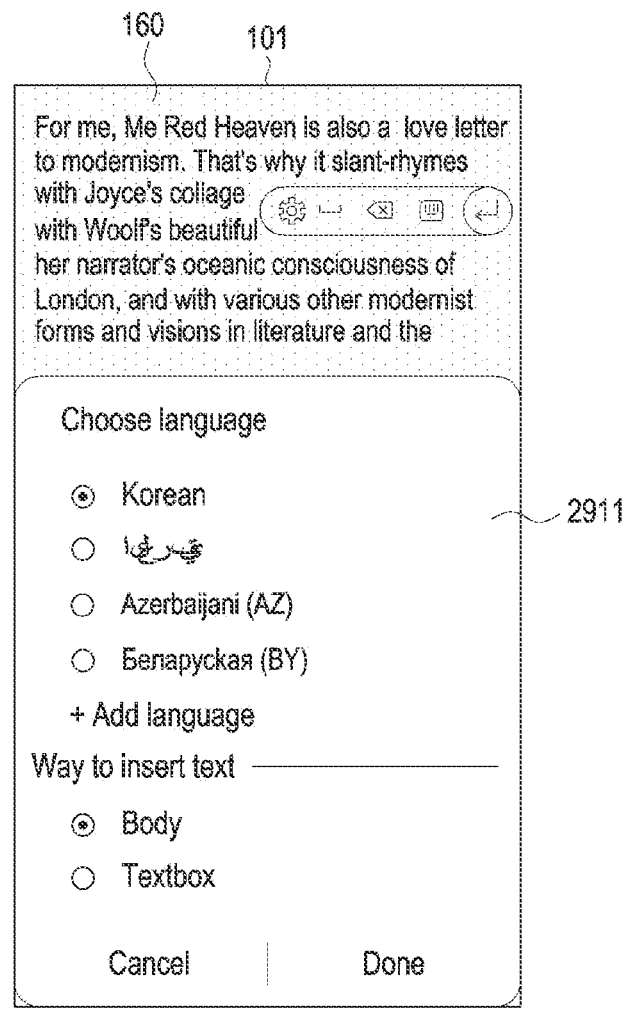
FIG. 29 is a view illustrating an operation method of an electronic device according to various embodiments.

FIG. 29 is a view illustrating an operation method of an electronic device according to various embodiments.

Referring to FIG. 29, the electronic device 101 (e.g., the processor 120) may display a screen 2911 where the language of the displayed text may be selected in relation to the display of the text based on the touch input, described above in connection with FIGS. 5 to 28. For example, the electronic device 101 may display the result of a recognition operation for the sensed touch input in text corresponding to Korean, based on selection of a designated language (e.g., Korean) on the displayed screen 2911. For example, based on selection of Korean in a case where a touch input corresponding to a circle and a touch input corresponding to a vertical line are sensed, the electronic device 101 may display the text corresponding to the touch input as "O|" and, based on selection of English, the electronic device 101 may display the text corresponding to the touch input as "ol."

It may be understood by one of ordinary skill in the art that various embodiments described herein may be applied simultaneously within the applicable scope.

According to various embodiments, an electronic device 101 may comprise a display (e.g., the display module 160); and a processor 120 configured to recognize a first touch input on the display according to a first recognition period, display, on the display, a first text corresponding to the recognized first touch input, detect an event for changing a recognition period of the electronic device, set the recognition period to a second recognition period different from the first recognition period based on the detected event, recognize a second touch input on the display according to the second recognition period, and display, on the display, a second text corresponding to the recognized second touch input.

According to various embodiments, the processor may be configured to identify a first invocation time and a second invocation time of at least one screen update function, compare a first interval between the first invocation time and the second invocation time with a preset first reference range, and detect the event based on a result of the comparison.

According to various embodiments, the processor may be configured to determine that the event does not occur based on the first interval falling within the preset first reference range, and maintain the recognition period as the first recognition period.

According to various embodiments, the processor may be configured to set the recognition period to the second recognition period based on the first interval falling outside the preset first reference range.

According to various embodiments, when the first interval exceeds a maximum value of the preset first reference range, the second recognition period may be larger than the first recognition period. When the first interval is less than a minimum value of the preset first reference range, the second recognition period may be smaller than the first recognition period.

According to various embodiments, the processor may be configured to identify a number of invocations of at least one screen update function during a preset period, compare the number of invocations with a preset second reference range, and detect the event based on a result of the comparison.

According to various embodiments, the processor may be configured to sense the first touch input on the display at a first time, and change a scheme of displaying the first text on the display based on a state in which no touch input is sensed on the display lasting for a first period after the first time.

According to various embodiments, the processor may be configured to change the scheme of displaying the first text on the display by at least one of changing a color of the first text, changing whether the first text is underlined, changing a thickness of the first text, changing whether the first text is italicized, and changing whether the first text is highlighted.

According to various embodiments, the processor may be configured to sense the first touch input on the display at a first time, and perform a recognition operation in association with the first touch input and the second touch input based on sensing the second touch input on the display at a second time which is within a first period from the first time after an expiration time of the first recognition period.

According to various embodiments, the processor may be configured to sense the first touch input at a first point on the display, and perform a recognition operation in association with the first touch input and the second touch input based on sensing the second touch input at a second point which is within a preset reference distance from the first point.

According to various embodiments, the processor may be configured to sense the first touch input on the display at a first time, display, on the display, a first drawing object corresponding to the first touch input, display the first text on the display while displaying the first drawing object, and control the display to stop displaying the first drawing object while displaying the first text on the display, based on a state in which no touch input is sensed on the display lasting for a first period after the first time.

According to various embodiments, the processor may be configured to perform no recognition operation on the first touch input at an expiration time of the first recognition period, and perform a recognition operation on the first touch input at a second time when an input of the first touch input is terminated after the expiration time based on the input of the first touch input starting at a first time before the expiration time of the first recognition period and the input of the first touch input lasting at the expiration time of the first recognition period.

According to various embodiments, a method for operating an electronic device 101 may comprise recognizing a first touch input on a display (e.g., the display module 160) of the electronic device according to a first recognition period, displaying, on the display, a first text corresponding to the recognized first touch input, detecting an event for changing a recognition period of the electronic device, setting the recognition period to a second recognition period different from the first recognition period, based on the detected event, recognizing a second touch input on the display according to the second recognition period, and displaying, on the display, a second text corresponding to the recognized second touch input.

According to various embodiments, detecting the event for changing the recognition period may include identifying a first invocation time and a second invocation time of at least one screen update function, comparing a first interval between the first invocation time and the second invocation time with a preset first reference range, and detecting the event based on a result of the comparison.

According to various embodiments, the method may further comprise determining that the event does not occur based on the first interval falling within the preset first reference range and maintaining the recognition period as the first recognition period.

According to various embodiments, the method may further comprise setting the recognition period to a second recognition period, and setting the recognition period to the second recognition period based on the first interval falling outside the first reference range.

According to various embodiments, when the first interval exceeds a maximum value of the preset first reference range, the second recognition period may be larger than the first recognition period. When the first interval is less than a minimum value of the preset first reference range, the second recognition period may be smaller than the first recognition period.

According to various embodiments, detecting the event for changing the recognition period may include identifying a number of invocations of at least one screen update function during a preset period, comparing the number of invocations with a preset second reference range, and detecting the event based on a result of the comparison.

According to various embodiments, the method may further comprise sensing the first touch input on the display at a first time, and changing a scheme of displaying the first text on the display, based on a state in which no touch input is sensed on the display lasting for a first period after the first time.

According to various embodiments, changing the scheme of displaying the first text may include changing the scheme of displaying the first text on the display by at least one of changing a color of the first text, changing whether the first text is underlined, changing a thickness of the first text, changing whether the first text is italicized, and changing whether the first text is highlighted.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
at least one processor; and
memory storing instructions, wherein the instructions, when executed by the at least one processor individually or collectively, cause the electronic device to:
recognize a first touch input on the display during a first recognition period, wherein a recognition period is a period when the electronic device performs a recognition operation on touch input-based stroke data applying character recognition to handwritten content,
display, on the display, a first text corresponding to the recognized first touch input,
detect an event for changing a recognition period of the electronic device,
set, based on the event, the recognition period to a second recognition period different from the first recognition period,
recognize a second touch input on the display during the second recognition period, and
display, on the display, a second text corresponding to the recognized second touch input.

2. The electronic device of claim 1, wherein the instructions, when executed by the at least one processor individually or collectively, cause the electronic device to:
identify a first invocation time and a second invocation time of at least one screen update function; and
compare, based on a preset first reference range, a first interval between the first invocation time and the second invocation time, and
wherein the event is detected based on a result of the comparison.

3. The electronic device of claim 2, wherein the instructions, when executed by the at least one processor individually or collectively, cause the electronic device to:
determine that the event does not occur based on the first interval falling within the preset first reference range, and
maintain the recognition period as the first recognition period.

4. The electronic device of claim 2, wherein the instructions, when executed by the at least one processor individually or collectively, cause the electronic device to set the recognition period to the second recognition period based on the first interval falling outside the preset first reference range.

5. The electronic device of claim 4, wherein:
when the first interval exceeds a maximum value of the preset first reference range, the second recognition period is larger than the first recognition period, and
when the first interval is less than a minimum value of the preset first reference range, the second recognition period is smaller than the first recognition period.

6. The electronic device of claim 1, wherein the instructions, when executed by the at least one processor individually or collectively, cause the electronic device to:
identify a number of invocations of the at least one screen update function during a preset period; and
compare the number of invocations with a preset second reference range, and
wherein the event is detected based on a result of the comparison.

7. The electronic device of claim 1, wherein the instructions, when executed by the at least one processor individually or collectively, cause the electronic device to:
sense the first touch input on the display at a first time, and change a display scheme of the first text on the display based on a state in which no touch input is sensed on the display lasting during a first period after the first time.

8. The electronic device of claim 7, wherein the instructions, when executed by the at least one processor individually or collectively, cause the electronic device to change the display scheme of the first text on the display by at least one of changing a color of the first text, changing whether the first text is underlined, changing a thickness of the first text, changing whether the first text is italicized, and changing whether the first text is highlighted.

9. The electronic device of claim 1, wherein the instructions, when executed by the at least one processor individually or collectively, cause the electronic device to:
sense the first touch input on the display at a first time, and
perform a recognition operation in association with the first touch input and the second touch input based on sensing the second touch input on the display at a second time within a first period from the first time after an expiration time of the first recognition period.

10. The electronic device of claim 1, wherein the instructions, when executed by the at least one processor individually or collectively, cause the electronic device to:
sense the first touch input at a first point on the display, and
perform a recognition operation in association with the first touch input and the second touch input based on sensing the second touch input at a second point within a preset reference distance from the first point.

11. The electronic device of claim 1, wherein the instructions, when executed by the at least one processor individually or collectively, cause the electronic device to:
sense the first touch input on the display at a first time,
display, on the display, a first drawing object corresponding to the first touch input,
display the first text on the display while displaying the first drawing object, and
control the display to stop displaying the first drawing object while displaying the first text on the display based on a state in which no touch input is sensed on the display lasting for a first period after the first time.

12. The electronic device of claim 1, wherein the instructions, when executed by the at least one processor individually or collectively, cause the electronic device to:
perform a non-recognition operation on the first touch input at an expiration time of the first recognition period, and
perform a recognition operation on the first touch input at a second time when an input of the first touch input is terminated after the expiration time based on the input of the first touch input starting at a first time before the expiration time of the first recognition period and the input of the first touch input lasting at the expiration time of the first recognition period.

13. A method performed by an electronic device, the method comprising:
recognizing a first touch input on a display of the electronic device during a first recognition period, wherein a recognition period is a period when the electronic device performs a recognition operation on touch input-based stroke data applying character recognition to handwritten content,
displaying, on the display, a first text corresponding to the recognized first touch input,
detecting an event for changing a recognition period of the electronic device,
setting, based on the event, the recognition period to a second recognition period different from the first recognition period,
recognizing a second touch input on the display during the second recognition period, and
displaying, on the display, a second text corresponding to the recognized second touch input.

14. The method of claim 13, further comprising:
identifying a first invocation time and a second invocation time of at least one screen update function; and
comparing, based on a preset first reference range, a first interval between the first invocation time and the second invocation time,
wherein the event is detected based on a result of the comparison.

15. The method of claim 14, further comprising:
determining that the event does not occur based on the first interval falling within the preset first reference range, and
maintaining the recognition period as the first recognition period.

16. The method of claim 14, further comprising:
setting the recognition period to the second recognition period, and
setting the recognition period to the second recognition period based on the first interval falling outside the preset first reference range.

17. The method of claim 16, wherein:
when the first interval exceeds a maximum value of the preset first reference range, the second recognition period is larger than the first recognition period, and
when the first interval is less than a minimum value of the preset first reference range, the second recognition period is smaller than the first recognition period.

18. The method of claim 13, further comprising:
identifying a number of invocations of the at least one screen update function during a preset period; and
comparing the number of invocations with a preset second reference range,
wherein the event is detected based on a result of the comparison.

19. The method of claim 13, further comprising:
sensing the first touch input on the display at a first time, and
changing a display scheme of the first text on the display, based on a state in which no touch input is sensed on the display lasting during a first period after the first time.

20. The method of claim 19, further comprising: changing the display scheme of the first text on the display by at least one of changing a color of the first text, changing whether the first text is underlined, changing a thickness of the first text, changing whether the first text is italicized, and changing whether the first text is highlighted.

* * * * *